United States Patent
Duan et al.

(10) Patent No.: US 10,033,519 B2
(45) Date of Patent: Jul. 24, 2018

(54) C-PHY HALF-RATE CLOCK AND DATA RECOVERY ADAPTIVE EDGE TRACKING

(71) Applicant: QUALCOMM Incorporated, San Diego, CA (US)

(72) Inventors: Ying Duan, San Diego, CA (US); Yasser Ahmed, San Diego, CA (US); Abhay Dixit, San Diego, CA (US); Harry Huy Dang, San Diego, CA (US); Jing Wu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/348,290

(22) Filed: Nov. 10, 2016

(65) Prior Publication Data

US 2018/0131503 A1    May 10, 2018

(51) Int. Cl.
*H04L 29/06* (2006.01)
*H04L 7/00* (2006.01)

(52) U.S. Cl.
CPC ............ *H04L 7/0012* (2013.01); *H04L 69/28* (2013.01)

(58) Field of Classification Search
CPC ........ H04L 1/205; H04L 1/206; H04L 1/247; H04L 25/0272; H04L 25/0282; H04L 25/0294; H04L 25/0298; H04L 25/4917; H04L 5/20; H04L 7/042
See application file for complete search history.

(56) References Cited

U.S. PATENT DOCUMENTS

| | | | |
|---|---|---|---|
| 6,108,794 A | 8/2000 | Erickson | |
| 6,864,715 B1 | 3/2005 | Bauer et al. | |
| 7,474,720 B2 * | 1/2009 | Yuuki | H03L 7/0814 370/503 |
| 8,009,784 B2 | 8/2011 | Ko | |
| 9,137,008 B2 * | 9/2015 | Wiley | H04L 25/0292 |
| 9,184,909 B1 | 11/2015 | McCracken et al. | |
| 9,485,080 B1 * | 11/2016 | Duan | H04L 7/0008 |

(Continued)

OTHER PUBLICATIONS

International Search Report and Written Opinion—PCT/US2017/060918—ISA/EPO—dated Feb. 16, 2018.

(Continued)

*Primary Examiner* — Ross Varndell
(74) *Attorney, Agent, or Firm* — Loza & Loza LLP

(57) ABSTRACT

Methods, apparatus, and systems for data communication over a multi-wire, multi-phase interface are disclosed. A method for calibrating a clock recovery circuit includes recovering a first clock signal from transitions between pairs of symbols representative of successive signaling states of a 3-wire interface, where each pair of symbols includes a first symbol and a second symbol, generating a second clock signal by delaying the first clock signal by a first delay value, generating a third clock signal by delaying the second clock signal, calibrating the second clock signal and the third clock signal by initializing the first delay value such that the first sampling circuit, the second sampling circuit and the third sampling circuit capture the same symbol in a first pair of symbols, and incrementally increasing the first delay value until the second sampling circuit and the third sampling circuit capture different symbols from each pair of symbols.

30 Claims, 25 Drawing Sheets

(56) References Cited

U.S. PATENT DOCUMENTS

2015/0098538 A1* 4/2015 Wiley ............... H04L 1/205
                                                    375/355
2015/0199295 A1   7/2015 Sengoku

OTHER PUBLICATIONS

Loh M., et al., "A 3×9 Gb/s Shared, All-Digital CDR for High-Speed, High Density I/O", IEEE Journal of Solid-State Circuits, IEEE Service Center, Piscataway, NJ, USA, vol. 47, No. 3, Mar. 1, 2012, pp. 641-651, XP011422462, ISSN: 0018-9200, DOI: 10.1109/JSSC.2011.2178557.

* cited by examiner

C-PHY HALF-RATE CLOCK AND DATA RECOVERY ADAPTIVE EDGE TRACKING

TECHNICAL FIELD

The present disclosure relates generally to high-speed data communications interfaces, and more particularly, to clock generation in a receiver coupled to a multi-wire, multi-phase data communication link.

BACKGROUND

Manufacturers of mobile devices, such as cellular phones, may obtain components of the mobile devices from various sources, including different manufacturers. For example, an application processor in a cellular phone may be obtained from a first manufacturer, while an imaging device or camera may be obtained from a second manufacturer, and a display may be obtained from a third manufacturer. The application processor, the imaging device, the display controller, or other types of device may be interconnected using a standards-based or proprietary physical interface. In one example, an imaging device may be connected using the Camera Serial Interface (CSI) defined by the Mobile Industry Processor Interface (MIPI) Alliance. In another example, a display may include an interface that conforms to the Display Serial Interface (DSI) standard specified by the Mobile Industry Processor Interface (MIPI) Alliance A multiphase three-wire (C-PHY) interface defined by the MIPI Alliance uses a trio of conductors to transmit information between devices. Each of the three wires may be in one of three signaling states during transmission of a symbol over the C-PHY interface. Clock information is encoded in a sequence of symbols transmitted on the C-PHY interface and a receiver generates a clock signal from transitions between consecutive symbols. The maximum speed of the C-PHY interface and the ability of a clock and data recovery (CDR) circuit to recover clock information may be limited by the maximum time variation related to transitions of signals transmitted on the different wires of the communication link. A receiver may employ delay circuits to ensure that all of the conductors in the trio have assumed a stable signaling state before providing a sampling edge. The transmission rate of the link may be limited by the delay values used, and there is an ongoing need for clock generation circuits that can function reliably as signaling frequencies of multi-wire interfaces increase.

SUMMARY

Embodiments disclosed herein provide systems, methods and apparatus that enable improved communications on a multi-wire and/or multiphase communications link. The communications link may be deployed in apparatus such as a mobile terminal having multiple Integrated Circuit (IC) devices.

In various aspects of the disclosure, a method for calibrating a clock recovery circuit includes recovering a first clock signal from transitions between pairs of symbols representative of successive signaling states of a 3-wire interface, where each pair of symbols includes a first symbol and a second symbol, and where each pulse in the first clock signal corresponds to a transition from a first symbol to a second symbol. A first sampling circuit may be configured to capture each first symbol in the pairs of symbols in accordance with the first clock signal and ignore each second symbol in the pairs of symbols. The method may include generating a second clock signal by delaying the first clock signal by a first delay value. A second sampling circuit may be configured to capture symbols in accordance with the second clock signal. The method may include generating a third clock signal by delaying the second clock signal, wherein a third sampling circuit is configured to capture symbols in accordance with the third clock signal. The method may include calibrating the second clock signal and the third clock signal by initializing the first delay value such that the first sampling circuit, the second sampling circuit and the third sampling circuit capture the same symbol in a first pair of symbols, and incrementally increasing the first delay value until the second sampling circuit and the third sampling circuit capture different symbols from each pair of symbols. The method may include using the first clock signal and a mid-phase signal derived from the second clock signal or the third clock signal to capture symbols from the 3-wire interface after calibrating the second clock signal and the third clock signal.

In one aspect, the method includes incrementally increasing the first delay value after calibrating the second clock signal and the third clock signal, and providing the second clock signal as the mid-phase signal.

In one aspect, the method includes incrementally decreasing the first delay value after calibrating the second clock signal and the third clock signal, and providing the third clock signal as the mid-phase signal.

In one aspect, the method includes generating the mid-phase signal by delaying the second clock signal. The third clock signal may be generated by generating the mid-phase signal by delaying the second clock signal, and providing the third clock signal by delaying the mid-phase signal.

In one aspect, calibrating the second clock signal and the third clock signal includes configuring a programmable delay circuit.

In one aspect initializing the first delay value includes zeroing the first delay value. Initializing the first delay value may include selecting an initial value for the first delay value configured to cause the second sampling circuit and the third sampling circuit to capture the same symbol in the first pair of symbols for expected variations in manufacturing process, circuit supply voltage, and die temperature. Initializing the first delay value may include selecting an initial value for the first delay value configured to cause the second sampling circuit and the third sampling circuit to capture the same symbol in the first pair of symbols for all expected frequencies of the first clock signal.

In some aspects, a 3-phase signal is transmitted on each wire of the 3-wire interface and the 3-phase signal transmitted on each wire of the 3-wire interface is 120 degrees out-of-phase with each other wire in the 3-wire interface. In one example, the 3-wire interface may be operated in accordance with MIPI C-PHY specifications and/or protocols.

In various aspects of the disclosure, a clock recovery apparatus includes a plurality of difference receivers coupled to a 3-wire interface, a clock recovery circuit configured to provide a first clock signal that includes pulses corresponding to transitions between pairs of symbols representative of successive signaling states of outputs of the difference receivers, where each pair of symbols includes a first symbol and a second symbol, and where each pulse in the first clock signal corresponds to a transition from a first symbol to a second symbol. The clock recovery apparatus may include a first sampling circuit configured to capture each first symbol in the pairs of symbols in accordance with timing of pulses in the first clock signal and ignore each second symbol in the pairs of symbols, a first delay element providing a configurable first delay, and adapted to provide a second clock signal that is a delayed version of the first clock signal, a second sampling circuit configured to capture symbols in accordance with timing of pulses in the second clock signal, a second delay element providing a second delay, and adapted to provide a third clock signal that is a delayed version of the second clock signal, a third sampling circuit configured to capture symbols in accordance with timing of pulses in the third clock signal, and an edge tracking circuit. The edge tracking circuit may be configured to calibrate the clock recovery apparatus by initializing the first delay element using a time value that causes the first sampling circuit, the second sampling circuit and the third sampling circuit to capture a first symbol in a first pair of symbols, and incrementally increasing the first delay until the second sampling circuit captures a first symbol from a second pair of symbols and the third sampling circuit captures a second symbol from the second pair of symbols. The first clock signal and a mid-phase signal derived from the second clock signal or the third clock signal may be used to capture symbols from the 3-wire interface after the clock recovery apparatus has been calibrated.

In one aspect, the apparatus is configured to incrementally increase the first delay in the first delay element after calibrating the second clock signal and the third clock signal, provide the second clock signal as the mid-phase signal.

In one aspect, the apparatus is configured to incrementally decrease the first delay after calibrating the second clock signal and the third clock signal, and provide the third clock signal as the mid-phase signal. The first delay element may include a programmable delay line.

In one aspect, the clock recovery apparatus includes a third delay element providing a third delay and adapted to provide the mid-phase signal by delaying the second clock signal. The third clock signal may be a delayed version of the mid-phase signal.

In one aspect, the edge tracking circuit may be configured to initialize the programmable delay line with a value configured to cause the second sampling circuit and the third sampling circuit to capture the same symbol in the first pair of symbols for expected variations in manufacturing process, circuit supply voltage, and die temperature. The edge tracking circuit may be configured to initialize the programmable delay line with an initial value configured to cause the second sampling circuit and the third sampling circuit to capture the same symbol in the first pair of symbols for all expected frequencies of the first clock signal. The edge tracking circuit may be configured to initialize the programmable delay line with a zero value.

In some aspects, a 3-phase signal is transmitted on each wire of the 3-wire interface and the 3-phase signal transmitted on each wire of the 3-wire interface is 120 degrees out-of-phase with each other wire in the 3-wire interface. In one example, the 3-wire interface may be operated in accordance with MIPI C-PHY specifications and/or protocols.

In various aspects of the disclosure, an apparatus includes means for recovering a first clock signal from transitions between pairs of symbols representative of successive signaling states of a 3-wire interface, where each pair of symbols includes a first symbol and a second symbol, wherein each pulse in the first clock signal corresponds to a transition from a first symbol to a second symbol. The apparatus may comprise means for generating clock signals, including a first delay element that produces a configurable first delay period, and is adapted to generate a second clock signal by delaying the first clock signal by the first delay period, and a second delay element configured to generate a third clock signal by delaying the second clock signal. The apparatus may comprise means for capturing symbols including a first sampling circuit adapted to capture each first symbol in the pairs of symbols in accordance with the first clock signal and further configured to ignore each second symbol in the pairs of symbols, a second sampling circuit adapted to capture symbols in the pairs of symbols in accordance with the second clock signal, and a third sampling circuit adapted to capture symbols in the pairs of symbols in accordance with the third clock signal. The apparatus may comprise means for calibrating the second clock signal and the third clock signal, configured to initialize the first delay period such that the first sampling circuit, the second sampling circuit and the third sampling circuit capture the same symbol in a first pair of symbols, and incrementally increase the first delay period until the second sampling circuit and the third sampling circuit capture different symbols from each pair of symbols. The means for capturing symbols may be configured to use the first clock signal and a mid-phase signal derived from the second clock signal or the third clock signal to capture symbols from the 3-wire interface after the second clock signal and the third clock signal have been calibrated.

In one aspect, the means for calibrating is configured to incrementally modify the first delay period after calibrating the second clock signal and the third clock signal to obtain the mid-phase signal.

In some aspects, the means for calibrating is configured to select an initial period for the first delay period configured to cause the second sampling circuit and the third sampling circuit to capture the same symbol in the first pair of symbols for expected variations in manufacturing process, circuit supply voltage, and die temperature. The first delay element may be implemented using a programmable delay line.

In some aspects, a 3-phase signal is transmitted on each wire of the 3-wire interface and the 3-phase signal transmitted on each wire of the 3-wire interface is 120 degrees out-of-phase with each other wire in the 3-wire interface. In one example, the 3-wire interface may be operated in accordance with MIPI C-PHY specifications and/or protocols.

In various aspects of the disclosure, a processor readable storage medium is disclosed. The storage medium may be a non-transitory storage medium and may store code that, when executed by one or more processors, causes the one or more processors to recover a first clock signal from transitions between pairs of symbols representative of successive signaling states of a 3-wire interface, where each pair of symbols includes a first symbol and a second symbol, where each pulse in the first clock signal corresponds to a transition from a first symbol to a second symbol, and where a first sampling circuit is configured to capture each first symbol in the pairs of symbols in accordance with the first clock signal and ignore each second symbol in the pairs of symbols. The storage medium may store code that causes the one or more processors to generate a second clock signal by delaying the first clock signal by a first delay value, where a second sampling circuit is configured to capture symbols in accordance with the second clock signal, and generate a third clock signal by delaying the second clock signal, where a third sampling circuit is configured to capture symbols in accordance with the third clock signal. The storage medium may store code that causes the one or more processors to calibrate the second clock signal and the third clock signal, including code that causes the one or more processors to initialize the first delay value such that the first sampling circuit, the second sampling circuit and the third sampling circuit capture the same symbol in a first pair of symbols, and incrementally increase the first delay value until the second sampling circuit and the third sampling circuit capture different symbols from each pair of symbols. The storage medium may store code that causes the one or more processors to use the first clock signal and a mid-phase signal derived from the second clock signal or the third clock signal to capture symbols from the 3-wire interface. after calibrating the second clock signal and the third clock signal.

DETAILED DESCRIPTION

Figure 1:
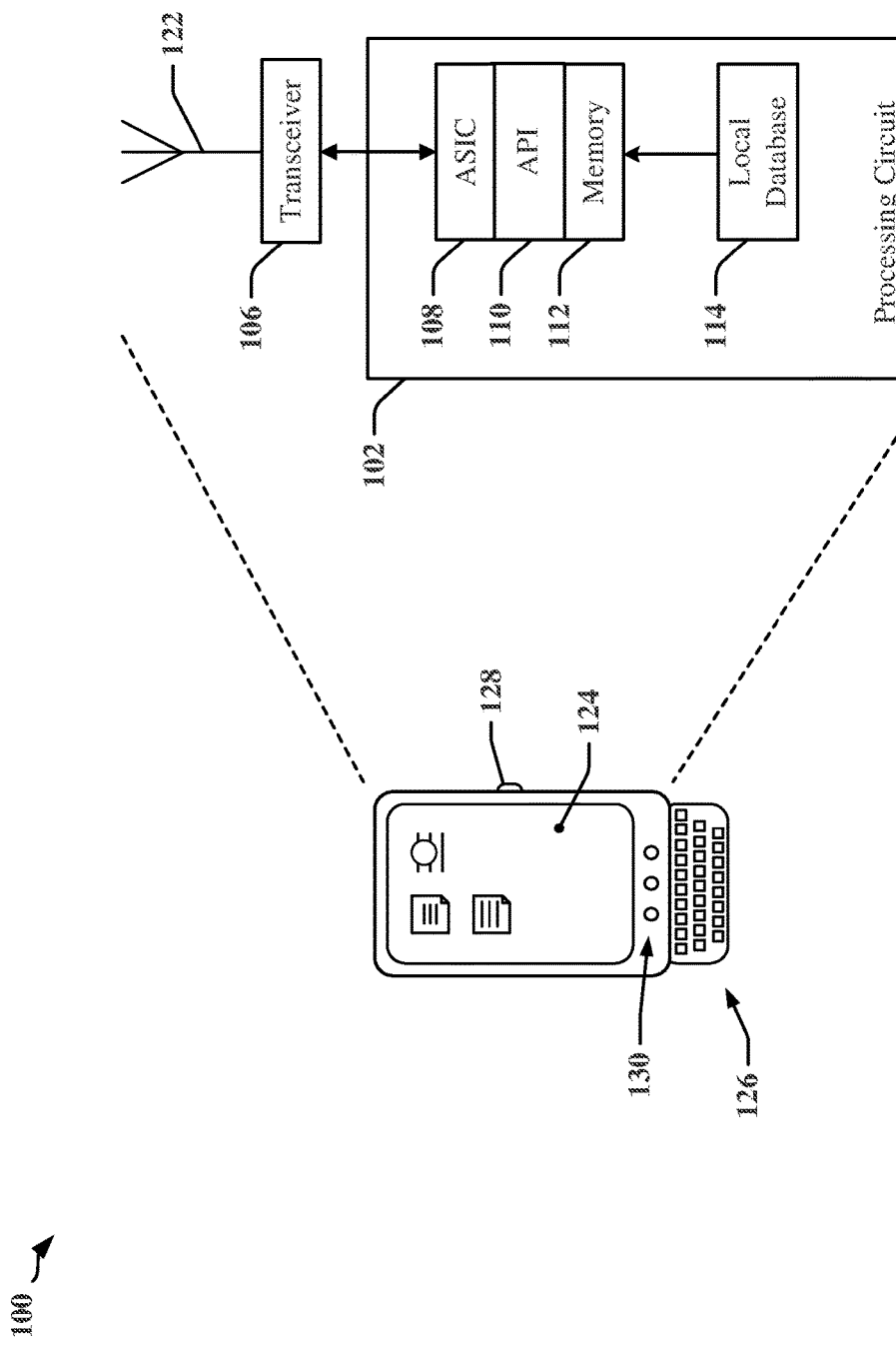
FIG. 1 depicts an apparatus employing a data link between IC devices that selectively operates according to one of plurality of available standards.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well-known structures and components are shown in block diagram form in order to avoid obscuring such concepts.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Overview

Certain aspects of the invention may be applicable to a C-PHY interface specified by the MIPI Alliance, which may be deployed to connect electronic devices that are subcomponents of a mobile apparatus such as a telephone, a mobile computing device, an appliance, automobile electronics, avionics systems, etc. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, a wearable computing device (e.g., a smartwatch, a health or fitness tracker, etc.), an appliance, a sensor, a vending machine, or any other similarly functioning device.

The C-PHY interface is a high-speed serial interface that can provide high throughput over bandwidth-limited channels. The C-PHY interface may be deployed to connect application processors to peripherals, including displays and cameras. The C-PHY interface encodes data into symbols that are transmitted in a three-phase signal over a set of three wires, which may be referred to as a trio, or trio of wires. The three-phase signal is transmitted on each wire of the trio in different phases. Each three-wire trio provides a lane on a communications link. A symbol interval may be defined as the interval of time in which a single symbol controls the signaling state of a trio. In each symbol interval, one wire is "undriven" while the remaining two of the three wires are differentially driven such that one of the two differentially driven wires assumes a first voltage level and the other differentially driven wire assumes to a second voltage level different from the first voltage level. The undriven wire may float, be driven, and/or be terminated such that it assumes a third voltage level that is at or near the mid-level voltage between the first and second voltage levels. In one example, the driven voltage levels may be +V and −V with the undriven voltage being 0 V. In another example, the driven voltage levels may be +V and 0 V with the undriven voltage being +V/2. Different symbols are transmitted in each consecutively transmitted pair of symbols, and different pairs of wires may be differentially driven in different symbol intervals.

FIG. 1 depicts an example of apparatus 100 that may employ a C-PHY 3-phase communication link. The apparatus 100 may include a wireless communication device that communicates through a radio frequency (RF) communications transceiver 106 with a radio access network (RAN), a core access network, the Internet and/or another network. The communications transceiver 106 may be operably coupled to a processing circuit 102. The processing circuit 102 may include one or more IC devices, such as an application-specific IC (ASIC) 108. The ASIC 108 may include one or more processing devices, logic circuits, and so on. The processing circuit 102 may include and/or be coupled to processor readable storage such as memory devices 112 that may include processor-readable devices that store and maintain data and instructions for execution or for other use by the processing circuit 102 and devices, and/or memory cards that support a display 124. The processing circuit 102 may be controlled by one or more of an operating system and an application programming interface (API) 110 layer that supports and enables execution of software modules residing in storage media, such as the memory device 112 of the wireless device. The memory devices 112 may include read-only memory (ROM), dynamic random-access memory (DRAM), one or more types of programmable read-only memory (PROM), flash cards, or any memory type that can be used in processing systems and computing platforms. The processing circuit 102 may include or access a local database 114 that can maintain operational parameters and other information used to configure and operate the apparatus 100. The local database 114 may be implemented using one or more of a database module, flash memory, magnetic media, electrically-erasable PROM (EEPROM), optical media, tape, soft or hard disk, or the like. The processing circuit may also be operably coupled to external devices such as an antenna 122, the display 124, operator controls, such as a button 128 and a keypad 126 among other components.

Figure 2:
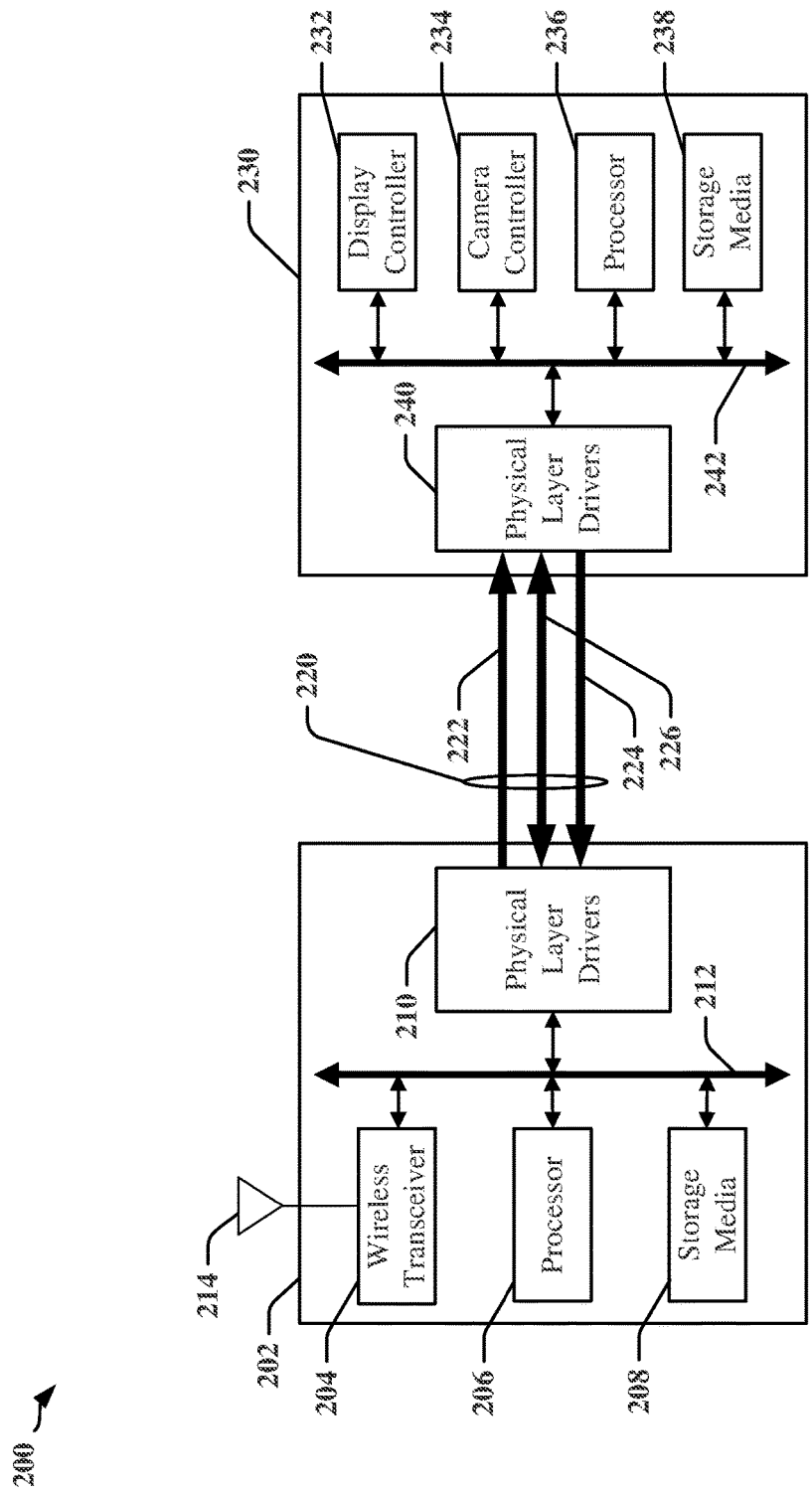
FIG. 2 illustrates a system architecture for an apparatus employing a data link between IC devices that selectively operates according to one of plurality of available standards.

FIG. 2 is a block schematic illustrating certain aspects of an apparatus 200 that includes a plurality of IC devices 202 and 230, which can exchange data and control information through a communication link 220. The communication link 220 may be used to connect a pair of IC devices 202 and 230 that are located in close proximity to one another, or that are physically located in different parts of the apparatus 200. In one example, the communication link 220 may be provided on a chip carrier, substrate or circuit board that carries the IC devices 202 and 230. In another example, a first IC device 202 may be located in a keypad section of a flip-phone while a second IC device 230 may be located in a display section of the flip-phone. In another example, a portion of the communication link 220 may include a cable or optical connection.

The communication link 220 may include multiple channels 222, 224 and 226. One or more channel 226 may be bidirectional, and may operate in half-duplex and/or full-duplex modes. One or more channel 222 and 224 may be unidirectional. The communication link 220 may be asymmetrical, providing higher bandwidth in one direction. In one example described herein, a first communications channel 222 may be referred to as a forward channel 222 while a second communications channel 224 may be referred to as a reverse channel 224. The first IC device 202 may be designated as a host system or transmitter, while the second IC device 230 may be designated as a client system or receiver, even if both IC devices 202 and 230 are configured to transmit and receive on the communications channel 222. In one example, the forward channel 222 may operate at a higher data rate when communicating data from a first IC device 202 to a second IC device 230, while the reverse channel 224 may operate at a lower data rate when communicating data from the second IC device 230 to the first IC device 202.

The IC devices 202 and 230 may each include a processor or other processing and/or computing circuit or device 206, 236. In one example, the first IC device 202 may perform core functions of the apparatus 200, including establishing and maintaining wireless communications through a wireless transceiver 204 and an antenna 214, while the second IC device 230 may support a user interface that manages or operates a display controller 232, and may control operations of a camera or video input device using a camera controller 234. Other features supported by one or more of the IC devices 202 and 230 may include a keyboard, a voice-recognition component, and other input or output devices. The display controller 232 may include circuits and software drivers that support displays such as a liquid crystal display (LCD) panel, touch-screen display, indicators and so on. The storage media 208 and 238 may include transitory and/or non-transitory storage devices adapted to maintain instructions and data used by respective processors 206 and 236, and/or other components of the IC devices 202 and 230. Communication between each processor 206, 236 and its corresponding storage media 208 and 238 and other modules and circuits may be facilitated by one or more internal bus 212 and 242 and/or a channel 222, 224 and/or 226 of the communication link 220.

The reverse channel 224 may be operated in the same manner as the forward channel 222, and the forward channel 222, and the reverse channel 224 may be capable of transmitting at comparable speeds or at different speeds, where speed may be expressed as data transfer rate and/or clocking rates. The forward and reverse data rates may be substantially the same or differ by orders of magnitude, depending on the application. In some applications, a single bidirectional channel 226 may support communications between the first IC device 202 and the second IC device 230. The forward channel 222 and/or the reverse channel 224 may be configurable to operate in a bidirectional mode when, for example, the forward and reverse channels 222 and 224 share the same physical connections and operate in a half-duplex manner. In one example, the communication link 220 may be operated to communicate control, command and other information between the first IC device 202 and the second IC device 230 in accordance with an industry or other standard.

The communication link 220 of FIG. 2 may be implemented according to MIPI Alliance specifications for C-PHY and may provide a wired bus that includes a plurality of signal wires (denoted as M wires). The M wires may be configured to carry N-phase encoded data in a high-speed digital interface, such as a mobile display digital interface (MDDI). The M wires may facilitate N-phase polarity encoding on one or more of the channels 222, 224 and 226. The physical layer drivers 210 and 240 may be configured or adapted to generate N-phase polarity encoded data for transmission on the communication link 220. The use of N-phase polarity encoding provides high speed data transfer and may consume half or less of the power of other interfaces because fewer drivers are active in N-phase polarity encoded data links.

N-phase polarity encoding devices 210 and/or 240 can typically encode multiple bits per transition on the communication link 220. In one example, a combination of 3-phase encoding and polarity encoding may be used to support a wide video graphics array (WVGA) 80 frames per second LCD driver IC without a frame buffer, delivering pixel data at 810 Mbps for display refresh.

Figure 3:
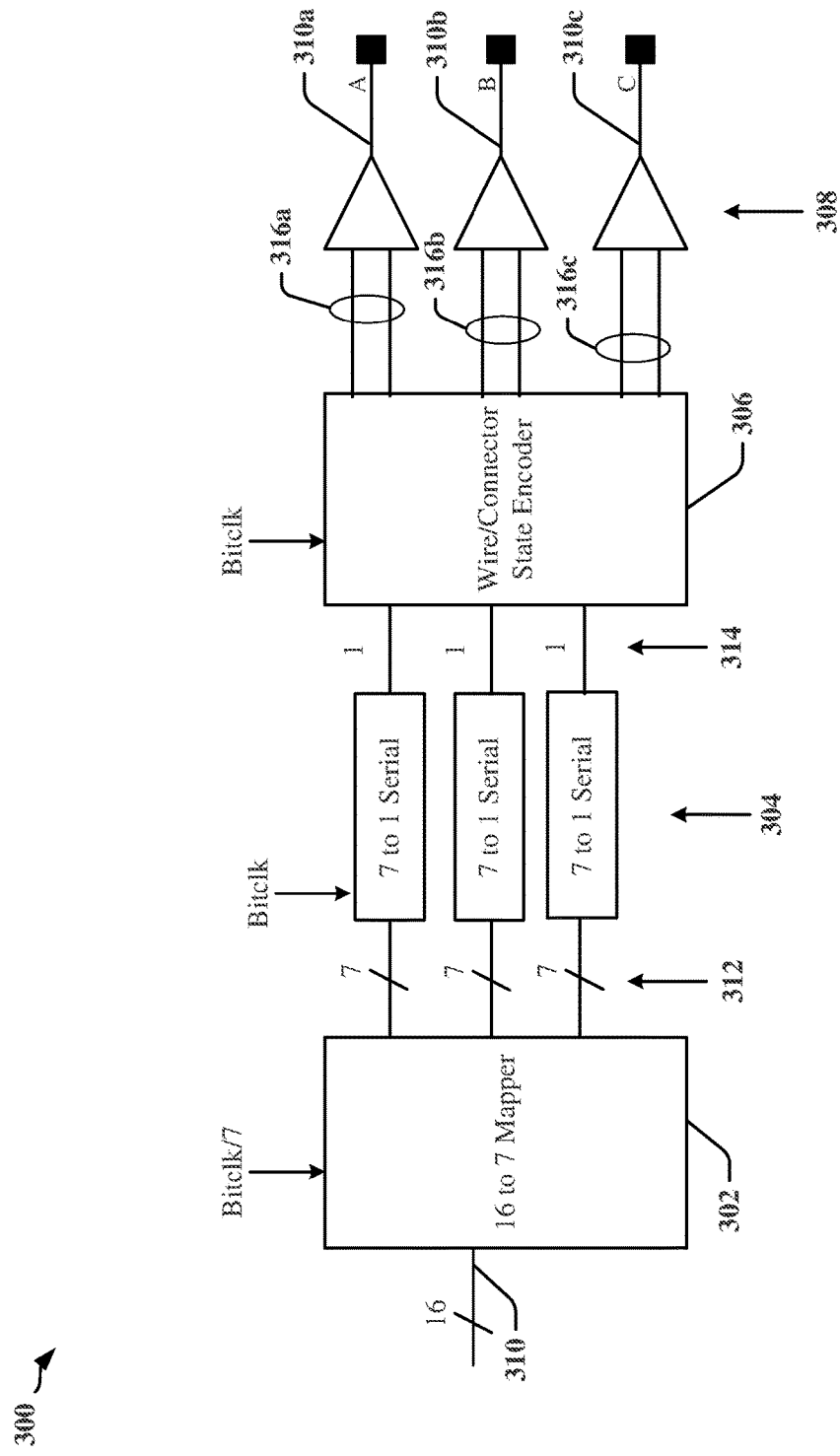
FIG. 3 illustrates a C-PHY 3-phase data encoder.

FIG. 3 is a schematic diagram 300 illustrating a 3-wire, 3-phase polarity encoder that may be used to implement certain aspects of the communication link 220 depicted in FIG. 2. The example of 3-wire, 3-phase encoding is selected solely for the purpose of simplifying descriptions of certain aspects of the invention. The principles and techniques disclosed for 3-wire, 3-phase encoders can be applied in other configurations of M-wire, N-phase polarity encoders.

Signaling states defined for each of the 3 wires in a 3-wire, 3-phase polarity encoding scheme may include an undriven state, a positively driven state and a negatively driven state. The positively driven state and the negatively driven state may be obtained by providing a voltage differential between two of the signal wires 310a, 310b and/or 310c, and/or by driving a current through two of the signal wires 310a, 310b and/or 310c connected in series such that the current flows in different directions in the two signal wires 310a, 310b and/or 310c. The undriven state may be realized by placing an output of a driver of a signal wire 310a, 310b or 310c in a high-impedance mode. Alternatively, or additionally, an undriven state may be obtained on a signal wire 310a, 310b or 310c by passively or actively causing an "undriven" signal wire 310a, 310b or 310c to attain a voltage level that lies substantially halfway between positive and negative voltage levels provided on driven signal wires 310a, 310b and/or 310c. Typically, there is no significant current flow through an undriven signal wire 310a, 310b or 310c. Signaling states defined for a 3-wire, 3-phase polarity encoding scheme may be denoted using the three voltage or current states (+1, −1, and 0).

A 3-wire, 3-phase polarity encoder may employ line drivers 308 to control the signaling state of signal wires 310a, 310b and 310c. The drivers 308 may be implemented as unit-level current-mode or voltage-mode drivers. In one example, each driver 308 may receive sets of two or more of signals 316a, 316b and 316c that determine the output state of corresponding signal wires 310a, 310b and 310c. In one example, the sets of two signals 316a, 316b and 316c may include a pull-up signal (PU signal) and a pull-down signal (PD signal) that, when high, activate pull-up and pull down circuits that drive the signal wires 310a, 310b and 310c toward a higher level or lower level voltage, respectively. In this example, when both the PU signal and the PD signal are low, the signal wires 310a, 310b and 310c may be terminated to a mid-level voltage.

For each transmitted symbol interval in an M-wire, N-phase polarity encoding scheme, at least one signal wire 310a, 310b or 310c is in the midlevel/undriven (0) voltage or current state, while the number of positively driven (+1 voltage or current state) signal wires 310a, 310b or 310c is equal to the number of negatively driven (−1 voltage or current state) signal wires 310a, 310b or 310c, such that the sum of current flowing to the receiver is always zero. For each symbol, the state of at least one signal wire 310a, 310b or 310c is changed from the symbol transmitted in the preceding transmission interval.

In operation, a mapper 302 may receive and map 16-bit data 310 to 7 symbols 312. In the 3-wire example, each of the 7 symbols defines the states of the signal wires 310a, 310b and 310c for one symbol interval. The 7 symbols 312 may be serialized using parallel-to-serial converters 304 that provide a timed sequence of symbols 314 for each signal wire 310a, 310b and 310c. The sequence of symbols 314 is typically timed using a transmission clock. A 3-wire 3-phase encoder 306 receives the sequence of 7 symbols 314 produced by the mapper one symbol at a time and computes the state of each signal wire 310a, 310b and 310c for each symbol interval. The 3-wire encoder 306 selects the states of the signal wires 310a, 310b and 310c based on the current input symbol 314 and the previous states of signal wires 310a, 310b and 310c.

The use of M-wire, N-phase encoding permits a number of bits to be encoded in a plurality of symbols where the bits per symbol is not an integer. In the example of a 3-wire communications link, there are 3 available combinations of 2 wires, which may be driven simultaneously, and 2 possible combinations of polarity on the pair of wires that is driven, yielding 6 possible states. Since each transition occurs from a current state, 5 of the 6 states are available at every transition. The state of at least one wire is required to change at each transition. With 5 states, $\log_2(5) \cong 2.32$ bits may be encoded per symbol. Accordingly, a mapper may accept a 16-bit word and convert it to 7 symbols because 7 symbols carrying 2.32 bits per symbol can encode 16.24 bits. In other words, a combination of seven symbols that encode five states has $5^7$ (78,125) permutations. Accordingly, the 7 symbols may be used to encode the $2^{16}$ (65,536) permutations of 16 bits.

Figure 4:
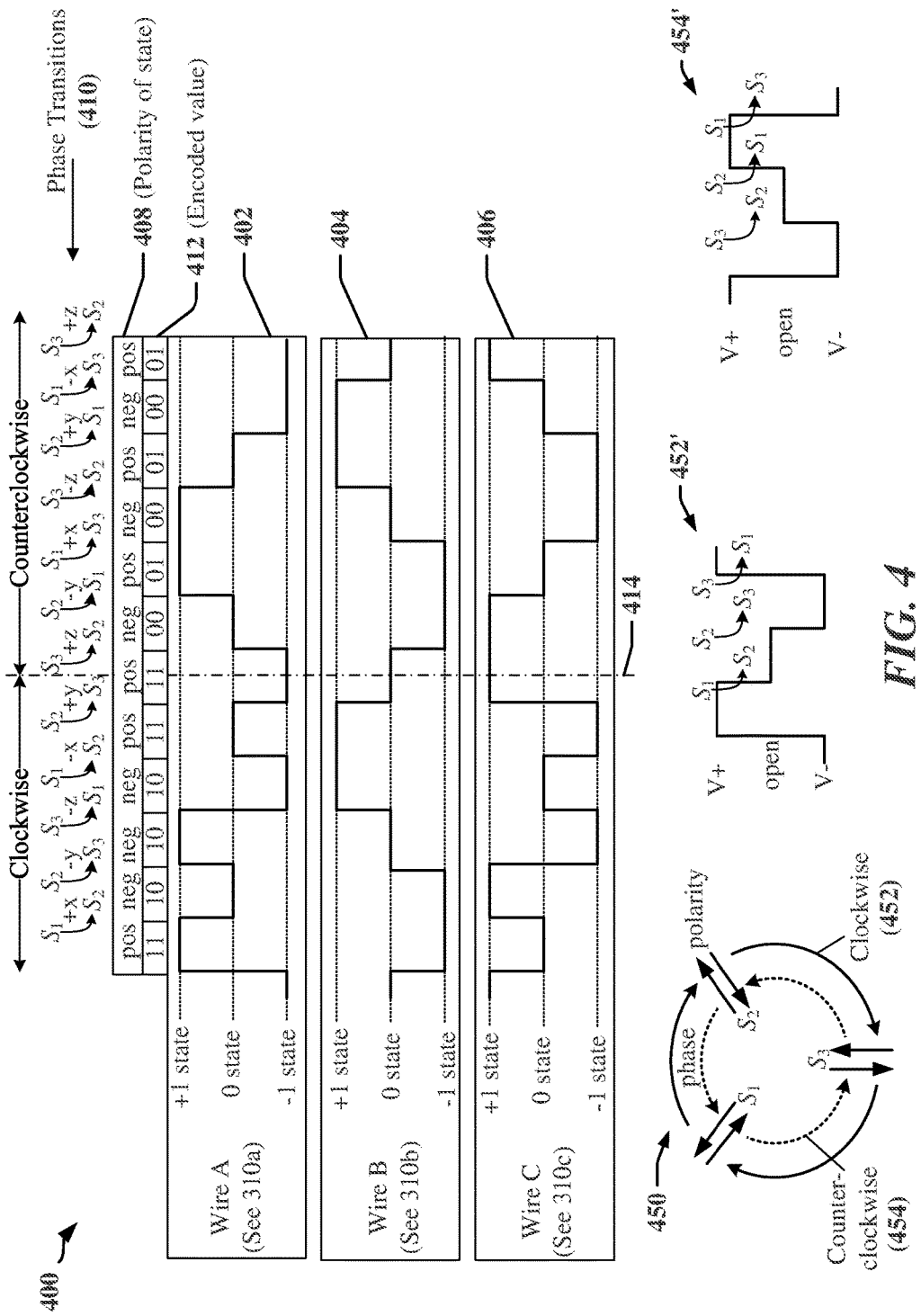
FIG. 4 illustrates signaling in a C-PHY 3-phase encoded interface.

FIG. 4 includes an example of a timing chart 400 for signals encoded using a three-phase modulation data-encoding scheme, which is based on the circular state diagram 450. Information may be encoded in a sequence of signaling states where, for example, a wire or connector is in one of three phase states $S_1$, $S_2$ and $S_3$ defined by the circular state diagram 450. Each state may be separated from the other states by a 120° phase shift. In one example, data may be encoded in the direction of rotation of phase states on the wire or connector. The phase states in a signal may rotate in clockwise direction 452 and 452' or counterclockwise direction 454 and 454'. In the clockwise direction 452 and 454' for example, the phase states may advance in a sequence that includes one or more of the transitions from $S_1$ to $S_2$, from $S_2$ to $S_3$ and from $S_3$ to $S_1$. In the counterclockwise direction 454 and 454', the phase states may advance in a sequence that includes one or more of the transitions from $S_1$ to $S_3$, from $S_3$ to $S_2$ and from $S_2$ to $S_1$. The three signal wires 310a, 310b and 310c carry different versions of the same signal, where the versions may be phase shifted by 120° with respect to one another. Each signaling state may be represented as a different voltage level on a wire or connector and/or a direction of current flow through the wire or connector. During each of the sequence of signaling states in a 3-wire system, each signal wire 310a, 310b and 310c is in a different signaling states than the other wires. When more than 3 signal wires 310a, 310b and 310c are used in a 3-phase encoding system, two or more signal wires 310a, 310b and/or 310c can be in the same signaling state at each signaling interval, although each state is present on at least one signal wire 310a, 310b and/or 310c in every signaling interval.

Information may be encoded in the direction of rotation at each phase transition 410, and the 3-phase signal may change direction for each signaling state. Direction of rotation may be determined by considering which signal wires 310a, 310b and/or 310c are in the '0' state before and after a phase transition, because the undriven signal wire 310a, 310b and/or 310c changes at every signaling state in a rotating three-phase signal, regardless of the direction of rotation.

The encoding scheme may also encode information in the polarity 408 of the two signal wires 310a, 310b and/or 310c that are actively driven. At any time in a 3-wire implementation, exactly two of the signal wires 310a, 310b, 310c are driven with currents in opposite directions and/or with a voltage differential. In one implementation, data may be encoded using two bit values 412, where one bit is encoded in the direction of phase transitions 410 and the second bit is encoded in the polarity 408 for the current state.

The timing chart 400 illustrates data encoding using both phase rotation direction and polarity. The curves 402, 404 and 406 relate to signals carried on three signal wires 310a, 310b and 310c, respectively for multiple phase states. Initially, the phase transitions 410 are in a clockwise direction and the most significant bit is set to binary '1,' until the rotation of phase transitions 410 switches at a time 414 to a counterclockwise direction, as represented by a binary '0' of the most significant bit. The least significant bit reflects the polarity 408 of the signal in each state.

According to certain aspects disclosed herein, one bit of data may be encoded in the rotation, or phase change in a 3-wire, 3-phase encoding system, and an additional bit may be encoded in the polarity of the two driven wires. Additional information may be encoded in each transition of a 3-wire, 3-phase encoding system by allowing transition to any of the possible states from a current state. Given 3 rotational phases and two polarities for each phase, 6 states are available in a 3-wire, 3-phase encoding system. Accordingly, 5 states are available from any current state, and there may be $\log_2(5) \cong 2.32$ bits encoded per symbol (transition), which allows the mapper 302 to accept a 16-bit word and encode it in 7 symbols.

N-Phase data transfer may use more than three wires provided in a communication medium, such as a bus. The use of additional signal wires that can be driven simultaneously provides more combinations of states and polarities and allows more bits of data to be encoded at each transition between states. This can significantly improve throughput of the system, and reduce the power consumption over approaches that use multiple differential pairs to transmit data bits, while providing increased bandwidth.

In one example, an encoder may transmit symbols using 6 wires with 2 pairs of wires driven for each state. The 6 wires may be labeled A through F, such that in one state, wires A and F are driven positive, wires B and E negative, and C and D are undriven (or carry no current). For six wires, there may be:

$$C(6, 4) = \frac{6!}{(6-4)! \cdot 4!} = 15$$

possible combinations of actively driven wires, with:

$$C(4, 2) = \frac{4!}{(4-2)! \cdot 2!} = 6$$

different combinations of polarity for each phase state.

The 15 different combinations of actively driven wires may include:

| | | | | |
|---|---|---|---|---|
| A B C D | A B C E | A B C F | A B D E | A B D F |
| A B E F | A C D E | A C D F | A C E F | A D E F |
| B C D E | B C D F | B C E F | B D E F | C D E F |

Of the 4 wires driven, the possible combinations of two wires driven positive (and the other two must be negative). The combinations of polarity may include: ++−−  +−−+  +−+−  −+−+  −++−  −−++

Accordingly, the total number of different states may be calculated as 15×6=90. To guarantee a transition between symbols, 89 states are available from any current state, and the number of bits that may be encoded in each symbol may be calculated as: $\log_2(89)$=6.47 bits per symbol. In this example, a 32-bit word can be encoded by the mapper into 5 symbols, given that 5×6.47=32.35 bits.

The general equation for the number of combinations of wires that can be driven for a bus of any size, as a function of the number of wires in the bus and number of wires simultaneously driven:

$$C(N_{wires}, N_{driven}) = \frac{N_{wires}!}{(N_{wires} - N_{driven})! \cdot N_{driven}!}$$

one equation for calculating the number of combinations of polarity for the wires being driven is:

$$C\left(N_{driven}, \frac{N_{driven}}{2}\right) = \frac{N_{driven}!}{\left(\left(\frac{N_{driven}}{2}\right)!\right)^2}$$

The equivalent number of bits per symbol may be stated as:

$$\log_2\left(C(N_{wires}, N_{driven}) \cdot C\left(N_{driven}, \frac{N_{driven}}{2}\right) - 1\right)$$

Figure 5:
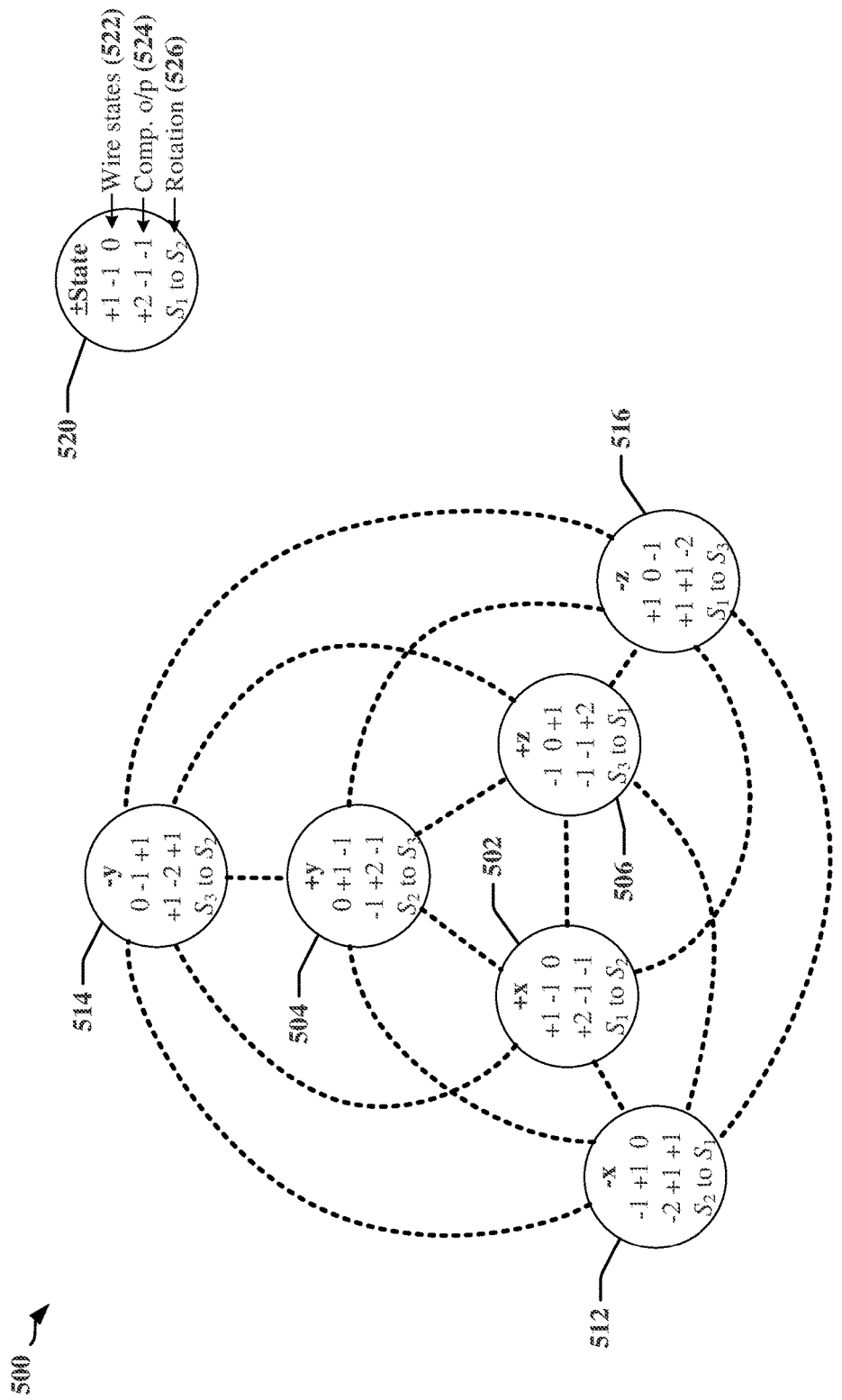
FIG. 5 is a state diagram illustrating potential state transitions in a C-PHY 3-phase encoded interface.

FIG. 5 is a state diagram 500 illustrating 6 states and 30 possible state transitions in one example of a 3-wire, 3-phase communication link. The possible states 502, 504, 506, 512, 514 and 516 in the state diagram 500 include and expand on the states shown in the circular state diagram 450 of FIG. 4. As shown in the exemplar of a state element 520, each state 502, 504, 506, 512, 514 and 516 in the state diagram 500 includes a field 522 showing the voltage state of signals A, B and C (transmitted on signal wires 310a, 310b and 310c respectively), a field 524 showing the result of a subtraction of wire voltages by differential receivers (see the differential receivers 602 of FIG. 6, for example), respectively and a field 526 indicating the direction of rotation. For example, in state 502 (+x) wire A=+1, wire B=−1 and wire C=0, yielding output of differential receiver 702a (A−B)=+2, differential receiver 702b (B−C)=−1 and differential receiver 702c (C−A)=+1. As illustrated by the state diagram, transition decisions taken by phase change detect circuitry in a receiver are based on 5 possible levels produced by differential receivers, which include −2, −1, 0, +1 and +2 voltage states.

Figure 6:
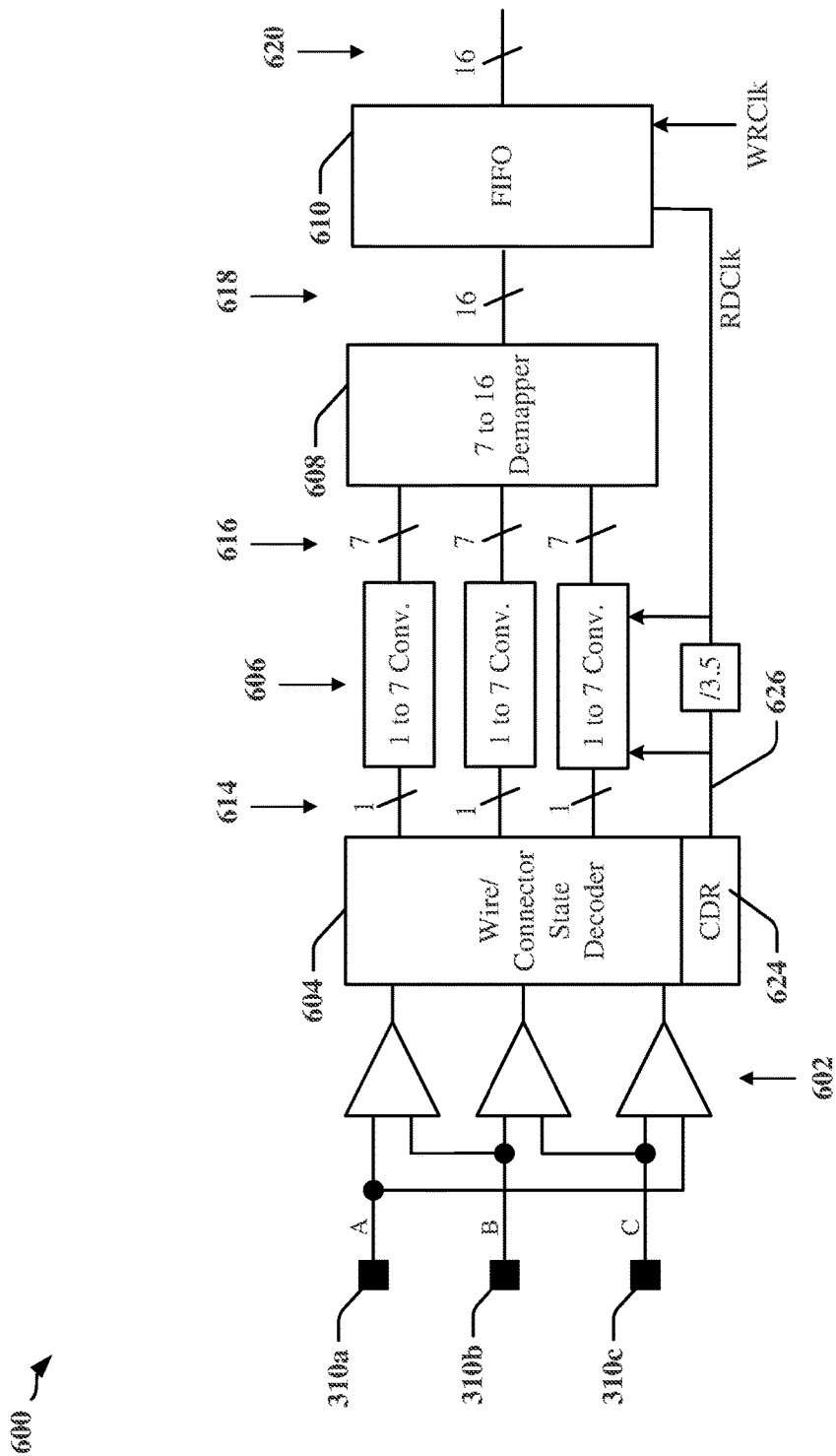
FIG. 6 illustrates a C-PHY decoder.

FIG. 6 is a diagram illustrating certain aspects of a 3-wire, 3-phase decoder 600. Differential receivers 602 and a wire state decoder 604 are configured to provide a digital representation of the state of the three transmission lines (e.g., the signal wires 310a, 310b and 310c illustrated in FIG. 3), with respect to one another, and to detect changes in the state of the three transmission lines compared to the state transmitted in the previous symbol period. Seven consecutive states are assembled by the serial-to-parallel convertors 606 to obtain a set of 7 symbols to be processed by the demapper 608. The demapper 608 produces 16 bits of data that may be buffered in a first-in-first-out (FIFO) register 610.

The wire state decoder 604 may extract a sequence of symbols 614 from phase encoded signals received on the signal wires 310a, 310b and 310c. The symbols 614 are encoded as a combination of phase rotation and polarity as disclosed herein. The wire state decoder may include a CDR circuit 624 that extracts a clock 626 that can be used to reliably capture symbols from the signal wires 310a, 310b and 310c. A transition occurs on least one of the signal wires 310a, 310b and 310c at each symbol boundary and the CDR circuit 624 may be configured to generate the clock 626 based on the occurrence of a transition or multiple transitions. An edge of the clock may be delayed to allow time for all signal wires 310a, 310b and 310c to have stabilized and to thereby ensure that the current symbol is captured for decoding purposes.

Jitter In 3-Phase Interfaces

A 3-phase transmitter includes drivers that provide high, low and middle-level voltages onto the transmit channel. This results in some variable transitions between consecutive symbol intervals. Low-to-high and high-to-low voltage transitions may be referred to as full-swing transitions, while low-to-middle and high-to-middle voltage transitions may be referred to as half-swing transitions. Different types of transitions may have different rise or fall times, and may result in different zero crossings at the receiver. These differences can result in "encoding jitter," which may impact link signal integrity performance.

Figure 7:
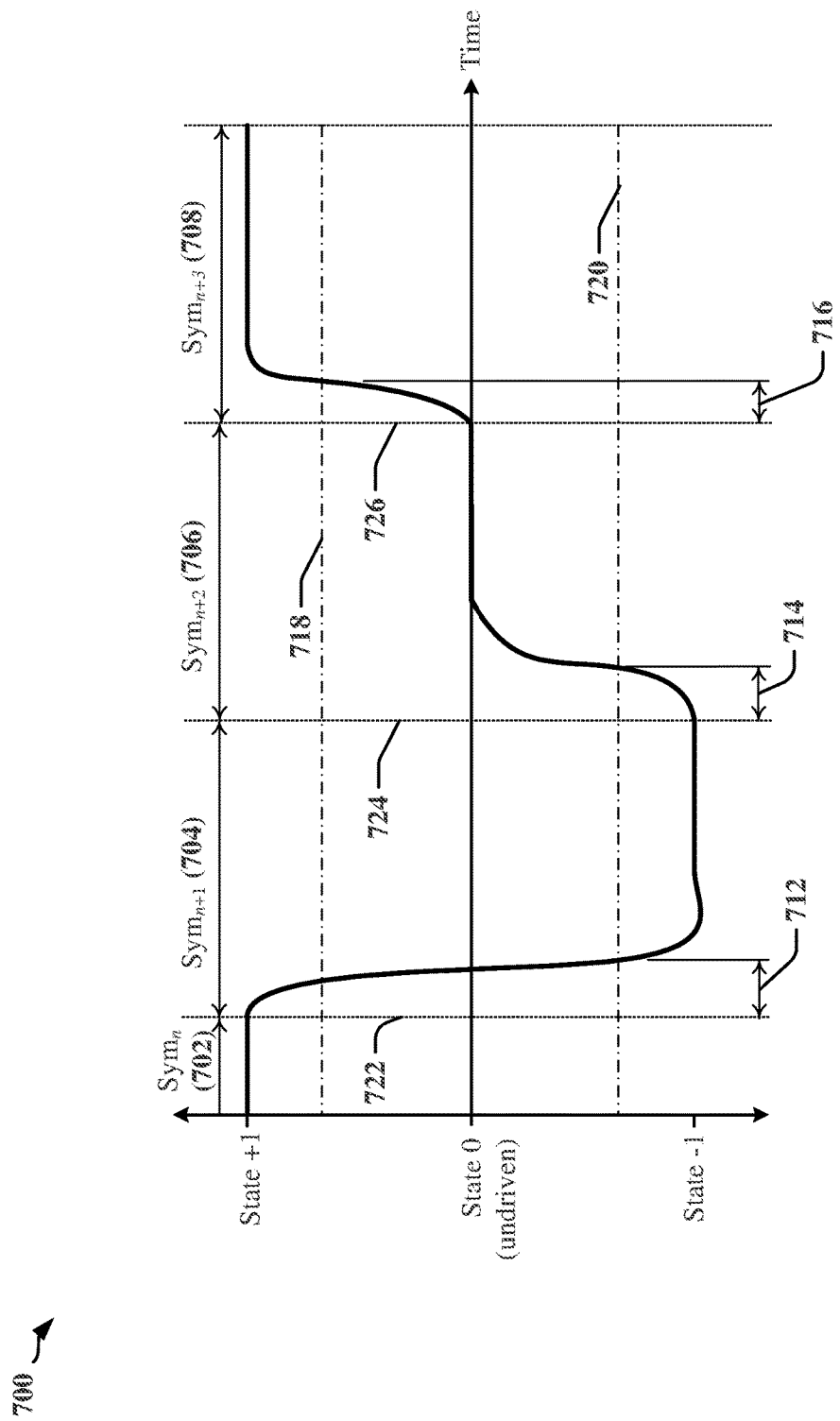
FIG. 7 is an example of the effects of signal rise times on transition detection in a C-PHY decoder.

FIG. 7 is a timing diagram 700 that illustrates certain aspects of transition variability at the output of a C-PHY 3-phase transmitter. Variability in signal transition times may be attributed to the existence of the different voltage and/or current levels used in 3-phase signaling. The timing diagram 700 illustrates transition times in a signal received from a single signal wire 310a, 310b or 310c. A first symbol $Sym_n$ 702 is transmitted in a first symbol interval that ends at a time 722 when a second symbol $Sym_{n+1}$ 724 is transmitted in a second symbol interval. The second symbol interval may end at time 726 when a third symbol $Sym_{n+2}$ 706 is transmitted in the third symbol interval, which ends when a fourth symbol $Sym_{n+3}$ 708 is transmitted in a fourth symbol interval. The transition from a state determined by the first symbol 702 to the state corresponding to the second symbol 704 may be detectable after a delay 712 attributable to the time taken for voltage in the signal wire 310a, 310b or 310c to reach a threshold voltage 718 and/or 720. The threshold voltages may be used to determine the state of the signal wire 310a, 310b or 310c. The transition from a state determined by the second symbol 704 to the state for the third symbol 706 may be detectable after a delay 714 attributable to the time taken for voltage in the signal wire 310a, 310b or 310c to reach one of the threshold voltages 718 and/or 720. The transition from a state determined by the third symbol 706 to the state for the fourth symbol 708 may be detectable after a delay 716 attributable to the time taken for voltage in the signal wire 310a, 310b or 310c to reach a threshold voltage 718 and/or 720. The delays 712, 714 and 716 may have different durations, which may be attributable in part to variations in device manufacturing processes and operational conditions, which may produce unequal effects on transitions between different voltage or current levels associated with the 3 states and/or different transition magnitudes. These differences may contribute to jitter and other issues in C-PHY 3-phase receiver.

Figure 8:
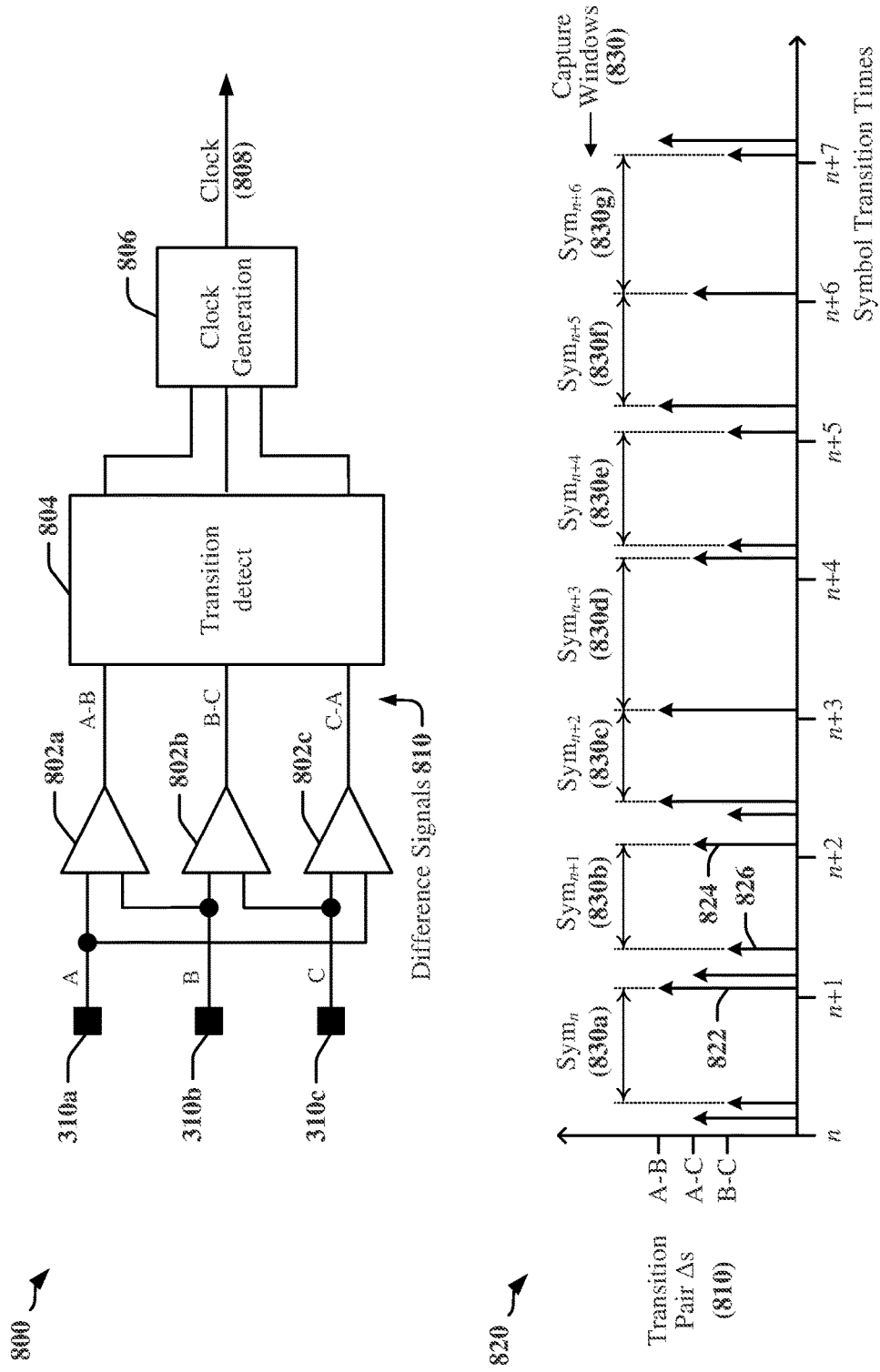
FIG. 8 illustrates transition detection in a C-PHY decoder.

FIG. 8 includes a block schematic 800 illustrating certain aspects of CDR circuits that may be provided in a receiver in a C-PHY 3-phase interface. A set of differential receivers 802a, 802b and 802c is configured to generate a set of difference signals 810 by comparing each of the three signal wires 310a, 310b and 310c in a trio with the other of the three signal wires 310a, 310b and 310c in the trio. In the example depicted, a first differential receiver 802a compares the states of signal wires 310a and 310b, a second differential receiver 802b compares the states of signal wires 310b and 310c and a third differential receiver 802c compares the states of signal wires 310a and 310c. Accordingly, a transition detection circuit 804 can be configured to detect occurrence of a phase change because the output of at least one of the differential receivers 802a, 802b and 802c changes at the end of each symbol interval.

Certain transitions between transmitted symbols may be detectable by a single differential receiver 802a, 802b or 802c, while other transitions may be detected by two or more of the differential receivers 802a, 802b and 802c. In one example the states, or relative states of two wires may be unchanged after a transition and the output of a corresponding differential receiver 802a, 802b or 802c may also be unchanged after the phase transition. In another example, both wires in a pair of signal wires 310a, 310b and/or 310c may be in the same state in a first time interval and both wires may be in a same second state in a second time interval and the corresponding differential receiver 802a, 802b or 802c may be unchanged after the phase transition. Accordingly, a clock generation circuit 806 may include a transition detection circuit 804 and/or other logic to monitor the outputs of all differential receivers 802a, 802b and 802c in order to determine when a phase transition has occurred. The clock generation circuit may generate a receive clock signal 808 based on detected phase transitions.

Changes in signaling states of the 3 wires may be detected at different times for different combinations of the signal wires 310a, 310b and/or 310c. The timing of detection of signaling state changes may vary according to the type of signaling state change that has occurred. The result of such variability is illustrated in the timing chart 820 of FIG. 8. Markers 822, 824 and 826 represent occurrences of transitions in the difference signals 810 provided to the transition detection circuit 804. The markers 822, 824 and 826 are assigned different heights in the timing chart 820 for clarity of illustration only, and the relative heights of the markers 822, 824 and 826 are not intended to show a specific relationship to voltage or current levels, polarity or weighting values used for clock generation or data decoding. The timing chart 820 illustrates the effect of timing of transitions associated with symbols transmitted in phase and polarity on the three signal wires 310*a*, 310*b* and 310*c*. In the timing chart 820, transitions between some symbols may result in variable capture windows 830*a*, 830*b*, 830*c*, 830*d*, 830*e*, 830*f* and/or 830*g* (collectively symbol capture windows 830) during which symbols may be reliably captured. The number of state changes detected and their relative timing can result in jitter on the clock signal 808.

The throughput of a C-PHY communications link may be affected by duration and variability in signal transition times. For example, variability in detection circuits may be caused by manufacturing process tolerances, variations and stability of voltage and current sources and operating temperature, as well as by the electrical characteristics of the signal wires 310*a*, 310*b* and 310*c*. The variability in detection circuits may limit channel bandwidth.

Figure 9:
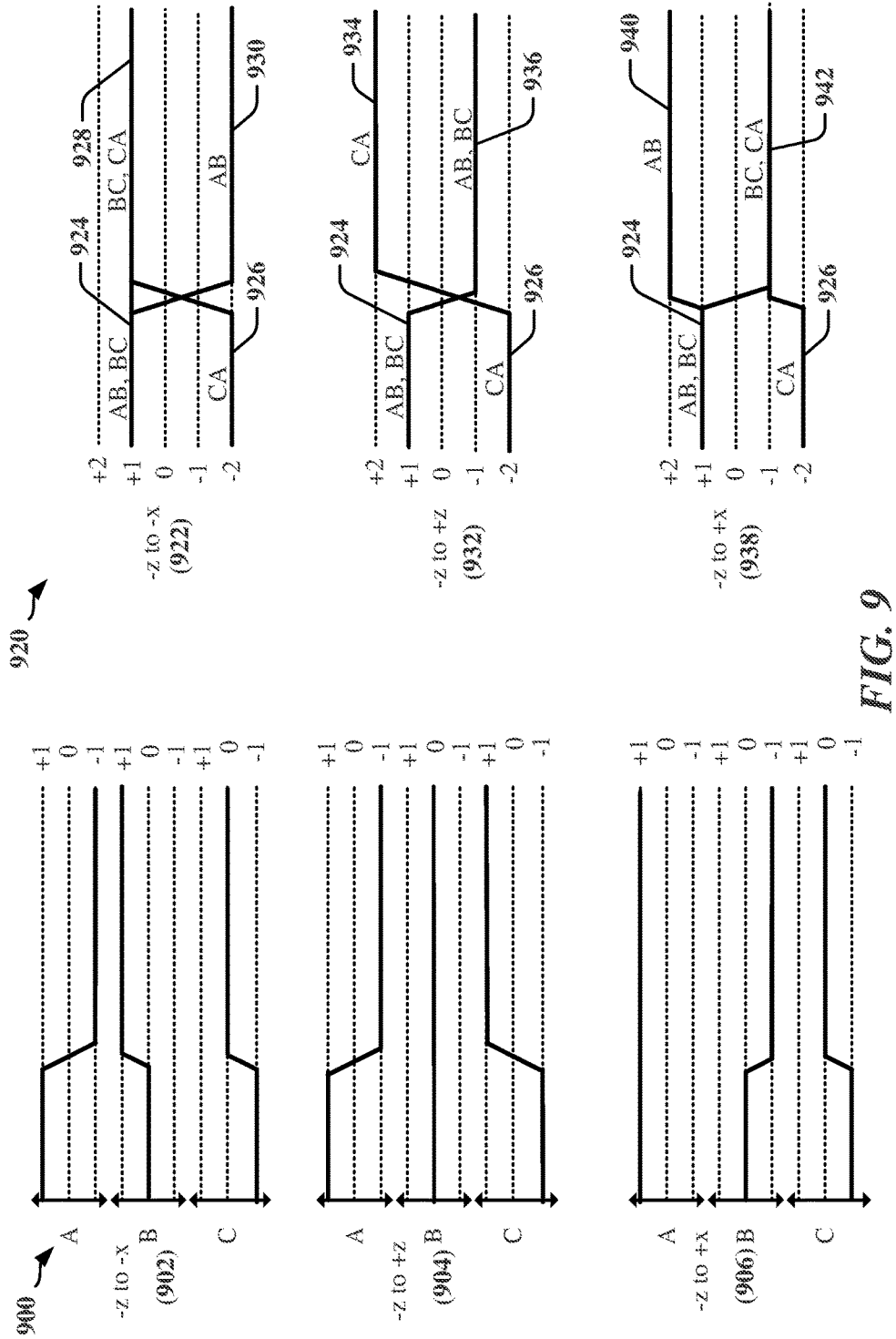
FIG. 9 illustrates one example of signal transitions occurring between pairs of consecutive symbols transmitted on a C-PHY interface.

FIG. 9 includes timing charts 900 and 920 representative of certain examples of transitions from a first signaling state to a second signaling state between certain consecutive symbols. The signaling state transitions illustrated in the timing charts 900 and 920 are selected for illustrative purposes, and other transitions and combinations of transitions can occur in a 3-phase signaling interface, including in the MIPI Alliance C-PHY interface. The timing charts 900 and 920 relate to an example of a 3-wire, 3-phase communications link, in which multiple receiver output transitions may occur at each symbol interval boundary due to differences in rise and fall time between the signal levels on the trio of wires. With reference also to FIG. 8, the first timing charts 900 illustrate the signaling states of the trio of signal wires 310*a*, 310*b* and 310*c* (A, B, and C) before and after a transition and second timing charts 920 illustrate the outputs of the differential receivers 802*a*, 802*b* and 802*c*, which provides difference signals 810 representative of the differences between signal wires 310*a*, 310*b* and 310*c*. In many instances, a set of differential receivers 802*a*, 802*b* and 802*c* may be configured to capture transitions by comparing different combinations for two signal wires 310*a*, 310*b* and 310*c*. In one example, these differential receivers 802*a*, 802*b* and 802*c* may be configured to produce outputs by determining the difference (e.g. by subtraction) of their respective input voltages.

In each of the examples shown in the timing charts 900 and 920, the initial symbol (−z) 516 (see FIG. 8) transitions to a different symbol. As shown in the timing charts 902, 904 and 906 signal A is initially in a +1 state, signal B is in a 0 state and signal C is in the −1 state. Accordingly, the differential receivers 802*a*, 802*b* initially measure a +1 difference 924 and the differential receiver 802*c* measures a −2 difference 926, as shown in the timing charts 922, 932, 938 for the differential receiver outputs.

In a first example corresponding to the timing charts 902, 922, a transition occurs from symbol (−z) 516 to symbol (−x) 512 (see FIG. 8) in which signal A transitions to a −1 state, signal B transitions to a +1 state and signal C transitions to a 0 state, with the differential receiver 802*a* transitioning from +1 difference 924 to a −2 difference 930, differential receiver 802*b* remaining at a +1 difference 924, 928 and differential receiver 802*c* transitioning from −2 difference 926 to a +1 difference 928.

In a second example corresponding to the timing charts 904, 932, a transition occurs from symbol (−z) 516 to symbol (+z) 506 in which signal A transitions to a −1 state, signal B remains at the 0 state and signal C transitions to a +1 state, with two differential receivers 802*a* and 802*b* transitioning from +1 difference 924 to a −1 difference 936, and differential receiver 802*c* transitioning from −2 difference 926 to a +2 difference 934.

In a third example corresponding to the timing charts 906, 938, a transition occurs from symbol (−z) 516 to symbol (+x) 502 in which signal A remains at the +1 state, signal B transitions to the −1 state and signal C transitions to a 0 state, with the differential receiver 802*a* transitioning from a +1 difference 924 to a +2 difference 940, the differential receiver 802*b* transitioning from a +1 difference 924 to a −1 difference 942, and the differential receiver 802*c* transitioning from −2 difference 926 to a −1 difference 942.

These examples illustrate transitions in difference values spanning 0, 1, 2, 3, 4 and 5 levels. Pre-emphasis techniques used for typical differential or single-ended serial transmitters were developed for two level transitions and may introduce certain adverse effects if used on a MIPI Alliance C-PHY 3-phase signal. In particular, a pre-emphasis circuit that overdrives a signal during transitions may cause overshoot during transitions spanning 1 or 2 levels and may cause false triggers to occur in edge sensitive circuits.

Figure 10:
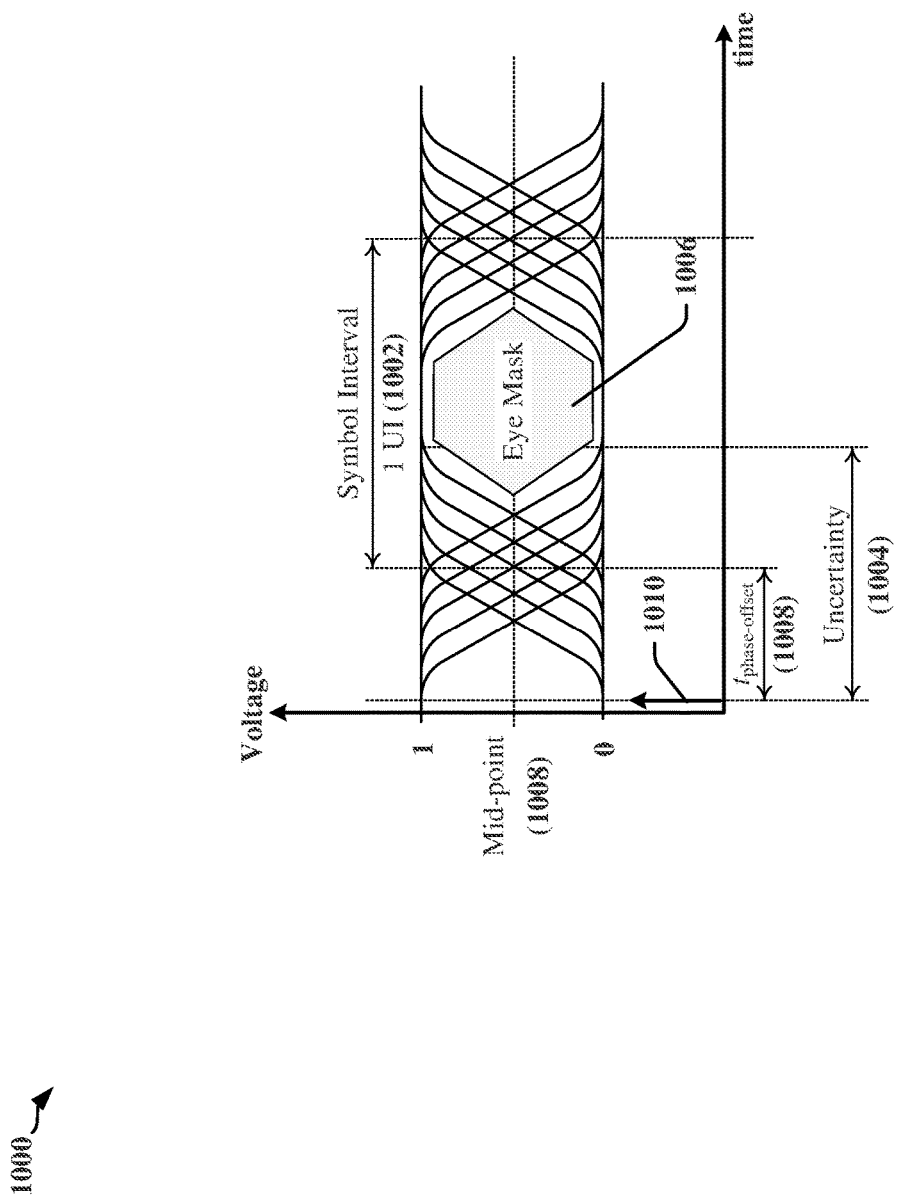
FIG. 10 illustrates transition regions and eye regions in an eye-pattern.

FIG. 10 illustrates an eye pattern 1000 generated as an overlay of multiple symbol intervals, including a single symbol interval 1002. A signal transition region 1004 represents a time period of uncertainty at the boundary between two symbols where variable signal rise times prevent reliable decoding. State information may be determined reliably in a region defined by an eye mask 1006 within an "eye opening" that represents the time period in which the symbol is stable and can be reliably received and decoded. The eye mask 1006 masks off a region in which zero crossings do not occur, and the eye mask is used by the decoder to prevent multiple clocking due to the effect of subsequent zero crossings at the symbol interval boundary that follow the first signal zero crossing.

The concept of periodic sampling and display of the signal is useful during design, adaptation and configuration of systems which use a clock-data recovery circuit that re-creates the received data-timing signal using frequent transitions appearing in the received data. A communication system based on Serializer/Deserializer (SERDES) technology is an example of a system where an eye pattern 1000 can be utilized as a basis for judging the ability to reliably recover data based on the eye opening of the eye pattern 1000.

An M-wire N-Phase encoding system, such as a 3-wire, 3-phase encoder may encode a signal that has at least one transition at every symbol boundary and the receiver may recover a clock using those guaranteed transitions. The receiver may require reliable data immediately prior to the first signal transition at a symbol boundary, and must also be able to reliably mask any occurrences of multiple transitions that are correlated to the same symbol boundary. Multiple receiver transitions may occur due to slight differences in rise and fall time between the signals carried on the M-wires (e.g. a trio of wires) and due to slight differences in signal propagation times between the combinations of signal pairs received (e.g. A-B, B-C, and C-A outputs of differential receivers 802a, 802b and 802c of FIG. 6).

Figure 11:
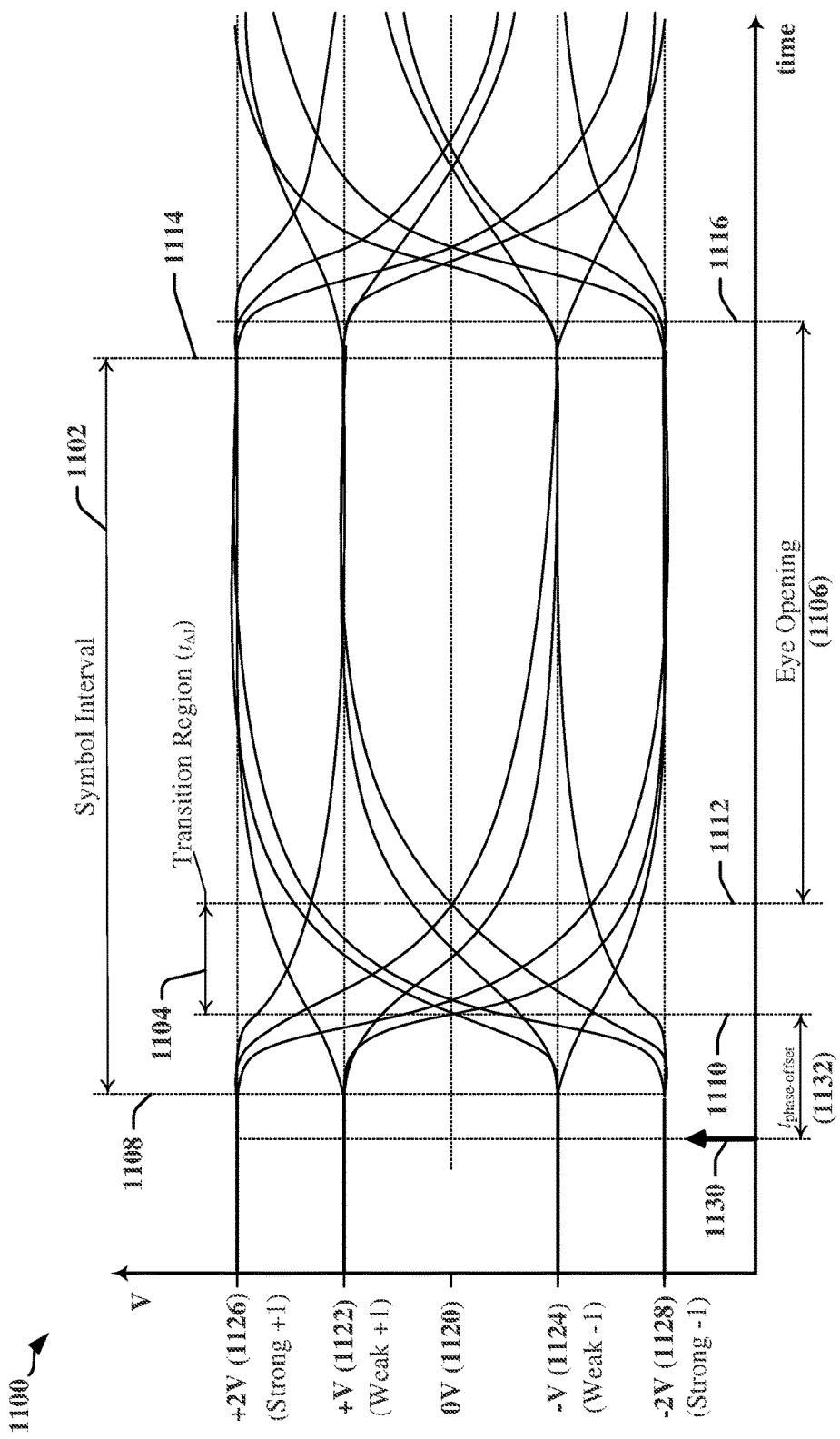
FIG. 11 illustrates an example of an eye-pattern generated for a C-PHY 3-Phase interface.

FIG. 11 illustrates an example of an eye-pattern 1100 generated for a C-PHY 3-phase signal. The eye-pattern 1100 may be generated from an overlay of multiple symbol intervals 1102. The eye-pattern 1100 may be produced using a fixed and/or symbol-independent trigger 1130. The eye-pattern 1100 includes an increased number of voltage levels 1120, 1122, 1124, 1126, 1128 that may be attributed to the multiple voltage levels measured by the differential receivers 802a, 802b, 802c an N-phase receiver circuit (see FIG. 8). In the example, the eye-pattern 1100 may correspond to possible transitions in 3-wire, 3-phase encoded signals provided to the differential receivers 802a, 802b, and 802c. The three voltage levels may cause the differential receivers 802a, 802b, and 802c to generate strong voltage levels 1126, 1128 and weak voltage levels 1122, 1124 for both positive and negative polarities. Typically, only one signal wire 310a, 310b and 310c is undriven in any symbol and the differential receivers 802a, 802b, and 802c do not produce a 0 state (here, 0 Volts) output. The voltages associated with strong and weak levels need not be evenly spaced with respect to a 0 Volts level. For example, the weak voltage levels 1122, 1124 represent a comparison of voltages that may include the voltage level reached by an undriven signal wire 310a, 310b and 310c. The eye-pattern 1100 may overlap the waveforms produced by the differential receivers 802a, 802b, and 802c because all three pairs of signals are considered simultaneously when data is captured at the receiving device. The waveforms produced by the differential receivers 802a, 802b, and 802c are representative of difference signals 810 representing comparisons of three pairs of signals (A-B, B-C, and C-A).

Drivers, receivers and other devices used in a C-PHY 3-Phase decoder may exhibit different switching characteristics that can introduce relative delays between signals received from the three wires. Multiple receiver output transitions may be observed at each symbol interval boundary 1108 and/or 1114 due to slight differences in the rise and fall time between the three signals of the trio of signal wires 310a, 310b, 310c and due to slight differences in signal propagation times between the combinations of pairs of signals received from the signal wires 310a, 310b, 310c. The eye-pattern 1100 may capture variances in rise and fall times as a relative delay in transitions near each symbol interval boundary 1108 and 1114. The variances in rise and fall times may be due to the different characteristics of the 3-Phase drivers. Differences in rise and fall times may also result in an effective shortening or lengthening of the duration of the symbol interval 1102 for any given symbol.

A signal transition region 1104 represents a time, or period of uncertainty, where variable signal rise times prevent reliable decoding. State information may be reliably determined in an "eye opening" 1106 representing the time period in which the symbol is stable and can be reliably received and decoded. In one example, the eye opening 1106 may be determined to begin at the end 1112 of the signal transition region 1104, and end at the symbol interval boundary 1114 of the symbol interval 1102. In the example depicted in FIG. 11, the eye opening 1106 may be determined to begin at the end 1112 of the signal transition region 1104, and end at a time 1116 when the signaling state of the signal wires 310a, 310b, 310c and/or the outputs of the three differential receivers 802a, 802b and 802c have begun to change to reflect the next symbol.

The maximum speed of a communication link 220 configured for N-Phase encoding may be limited by the duration of the signal transition region 1104 compared to the eye opening 1106 corresponding to the received signal. The minimum period for the symbol interval 1102 may be constrained by tightened design margins associated with the CDR circuit 624 in the decoder 600 illustrated in FIG. 6, for example. Different signaling state transitions may be associated with different variations in signal transition times corresponding to two or more signal wires 310a, 310b and/or 310c, thereby causing the outputs of the differential receivers 802a, 802b and 802c in the receiving device to change at different times and/or rates with respect to the symbol interval boundary 1108, where the inputs of the differential receivers 802a, 802b and 802c begin to change. The differences between signal transition times may result in timing skews between signaling transitions in two or more difference signals 810. CDR circuits may include delay elements and other circuits to accommodate timing skews between the difference signals 810.

Figure 12:
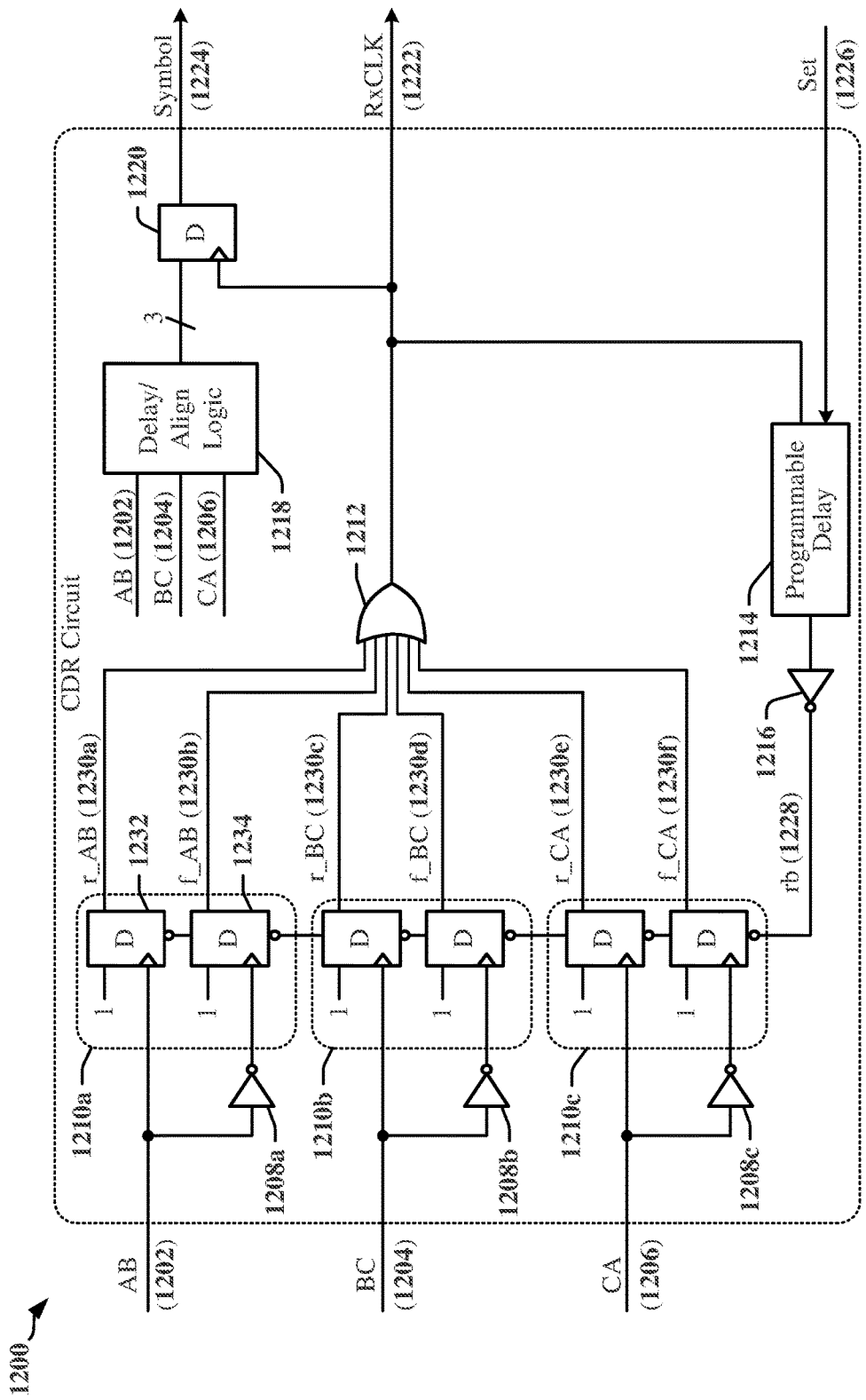
FIG. 12 illustrates an example of a CDR circuit for a C-PHY 3-Phase interface.

FIG. 12 provides an example of a CDR circuit 1200 for a 3-wire, 3-phase interface. The illustrated CDR circuit 1200 includes certain features and functional elements that are common to many different types of clock recovery circuits. The CDR circuit 1200 receives difference signals 1202, 1204, 1206, which may be derived from the difference signals 810 produced by the differential receivers 802a, 802b and 802c of FIG. 8 for example. In the CDR circuit 1200, each difference signal 1202, 1204, 1206 clocks a pair of D flip-flops 1210a, 1210b, 1210c to produce output signals 1230a-1230f. The output signals 1230a-1230f carry a pulse when a transition is detected on the corresponding difference signal 1202, 1204, 1206. A rising edge provided to a clock input on a D flip-flop clocks a logic one through the D flip-flop. Inverters 1208a, 1208b, 1208c may be used to provide inverted versions of the difference signals 1202, 1204, 1206 to one of the D flip-flops in each corresponding pair of D flip-flops 1210a, 1210b, 1210c. Accordingly, each pair of D flip-flops 1210a, 1210b, 1210c produces pulses responsive to rising edge and falling edges detected in the corresponding difference signal 1202, 1204, 1206.

For example, the AB difference signal 1202 is provided to a first D flip-flop 1232 of a first pair of D flip-flops 1210a, and the inverter 1208a provides an inverted version of the AB difference signal 1202 to a second D flip-flop 1234 of the first pair of D flip-flops 1210a. The D flip-flops are initially in a reset state. A rising edge on the AB difference signal 1202 clocks a logic one through the first D flip-flop 1232 causing the output of the first flip-flop (r_AB) 1230a to transition to a logic one state. A falling edge on the AB difference signal 1202 clocks a logic one through the second D flip-flop 1234 causing the output of the second flip-flop (f_AB) 1230b to transition to a logic one state.

The output signals 1230a-1230f are provided to logic, such as the OR gate 1212, which produces an output signal that may serve as the receiver clock (RxCLK) signal 1222. The RxCLK signal 1222 transitions to a logic one state when a transition occurs in signaling state of any of the difference signals 1202, 1204, 1206. The RxCLK signal 1222 is provided to a programmable delay element 1214, which drives a reset signal (rb) 1228 that resets the D flip-flops in the pairs of D flip-flops 1210a, 1210b, 1210c. In the illustrated example, an inverter 1216 may be included when the D flip-flops are reset by a low signal. When the D flip-flops are reset, the output of the OR gate 1212 returns to the logic zero state and the pulse on the RxCLK signal 1222 is terminated. When this logic zero state propagates through the programmable delay element 1214 and the inverter 1216, the reset condition on the D flip-flops is released.

While the D flip-flops are in the reset condition, transitions on the difference signals 1202, 1204, 1206 are ignored.

The programmable delay element 1214 is typically configured to produce a delay that has a duration that exceeds the difference in the timing skew between the occurrence of first and last transitions on the difference signals 1202, 1204, 1206. The programmable delay element 1214 configures the duration of pulses (i.e., the pulse width) on the RxCLK signal 1222. The programmable delay element 1214 may be configured when a Set signal 1226 is asserted by a processor or other control and/or configuration logic.

The RxCLK signal 1222 may also be provided to a set of three flip-flops 1220 that capture the signaling state of the difference signals 1202, 1204, 1206, providing a stable output symbol 1224 for each pulse that occurs on the RxCLK signal 1222. Delay or alignment logic 1218 may adjust the timing of the set of difference signals 1202, 1204, 1206. For example, the delay or alignment logic 1218 may be used to adjust the timing of the difference signals 1202, 1204, 1206 with respect to the pulses on the RxCLK signal 1222 to ensure that the flip-flops 1220 capture the signaling state of the difference signals 1202, 1204, 1206 when the difference signals 1202, 1204, 1206 are stable. The delay or alignment logic 1218 may delay edges in the difference signals 1202, 1204, 1206 based on the delay configured for the programmable delay element 1214.

The programmable delay element 1214 may be configured in the CDR circuit 1200 to accommodate possible large variations in transition times in the difference signals 1202, 1204, 1206. In one example, the programmable delay element 1214 may introduce a minimum delay period that exceeds the duration of the timing skew between the occurrence of the first and last transitions on the difference signals 1202, 1204, 1206. For reliable operation of the CDR circuit 1200, the maximum delay time provided by the programmable delay element 1214 may not be greater than the symbol interval. At faster data rates, timing skew increases as a proportion of the symbol interval 1102, and the eye opening 1106 can become small in comparison to the symbol interval 1102. The maximum symbol transmission rate may be limited when the timing skew reduces the percentage of the symbol interval 1102 occupied by the eye opening 1106 below a threshold size that can support reliable capture of symbols.

Figure 13:
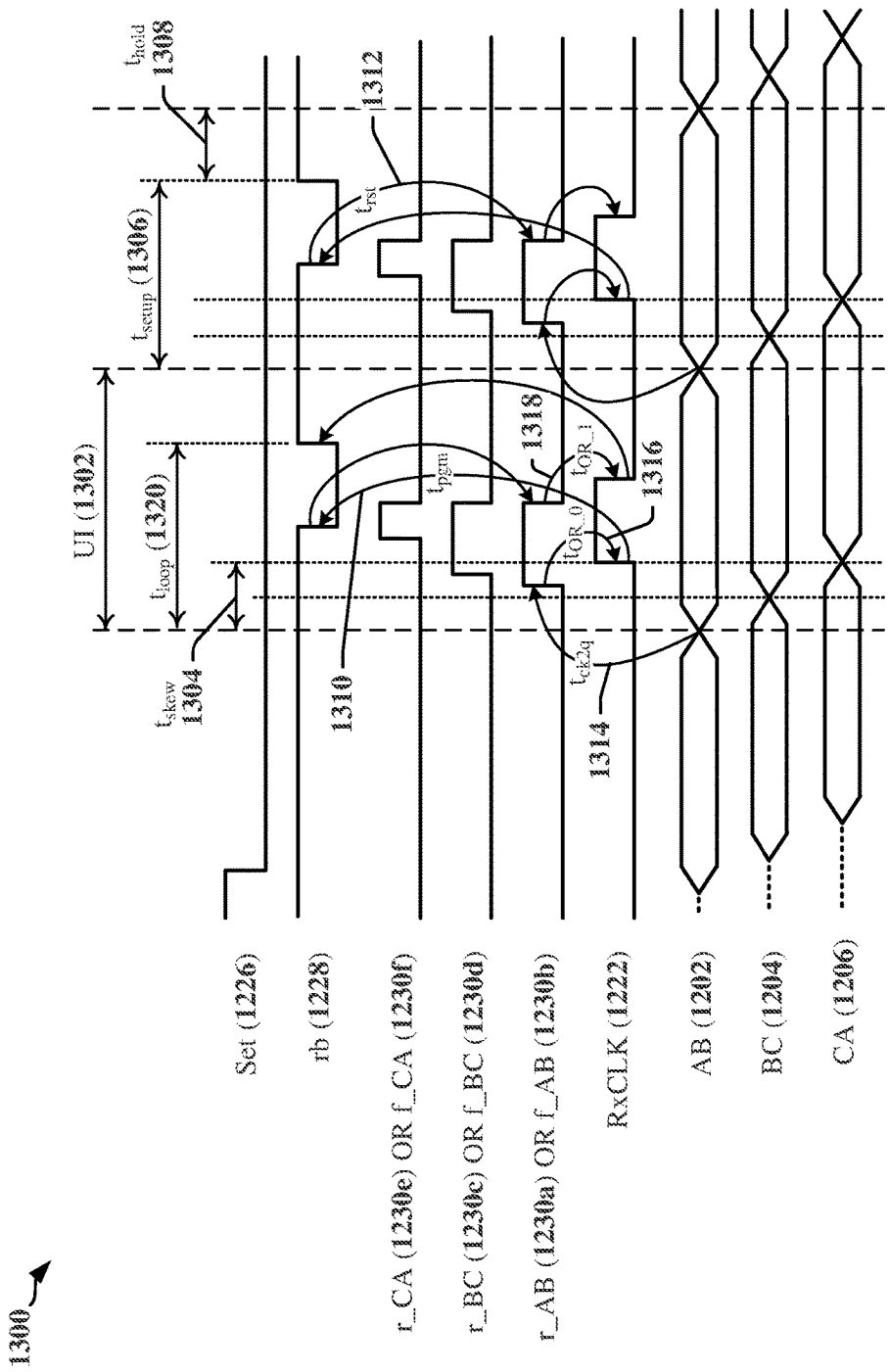
FIG. 13 illustrates timing associated with the CDR circuit of FIG. 12.

FIG. 13 is a timing diagram 1300 that illustrates certain aspects of the operation of the CDR circuit 1200. The diagram relates to operations after the programmable delay element 1214 has been configured, and the Set signal 1226 is inactive. The CDR circuit 1200 operates as an edge detector. C-PHY 3-phase encoding provides a single signaling state transition per unit interval (UI) 1302. Differences in the state of each wire of the trio, and/or transmission characteristics of the trio may cause a transition to appear at different times on two or more wires. The maximum difference in time of occurrence of transitions in the difference signals 1202, 1204, 1206 may be referred to as the skew time ($t_{skew}$) 1304. Other delays associated with the CDR circuit 1200 include the propagation delay ($t_{ck2q}$) 1314 through the pairs of D flip-flops 1210a, 1210b, 1210c, the propagation delay ($t_{OR\_0}$) 1316 associated with a rising edge passed through the OR gate 1212, the propagation delay ($t_{OR\_1}$) 1318 associated with a falling edge passed through the OR gate 1212, the programmable delay ($t_{pgm}$) 1310 combining the delay introduced by the programmable delay element 1214 and driver/inverter 1216, and the reset delay ($t_{rst}$) 1312 corresponding to the delay between time of receipt of the rb signal 1228 by the pairs of D flip-flops 1210a, 1210b, 1210c and time at which the flip-flop outputs are cleared.

A loop time ($t_{loop}$) 1320 may be defined as:

$$t_{loop}=t_{ck2q}+t_{OR\_1}+t_{pgm}+t_{rst}+t_{OR\_0}+t_{pgm}.$$

The relationship between $t_{loop}$ 1320 and the UI 1302 may determine the reliability of operation of the CDR circuit 1200. This relationship is affected by clock frequency used for transmission, which has a direct effect on the UI 1302, and variability in the operation of the programmable delay element 1214.

In some devices, the operation of the programmable delay element 1214 can be afflicted by variations in manufacturing process, circuit supply voltage, and die temperature (PVT). The delay time provided by the programmable delay element 1214 for a configured value may vary significantly from device to device, and/or from circuit to circuit within a device. In conventional systems, the nominal operating condition of the CDR circuit 1200 is generally set by design to generate a clock edge somewhere in the middle of the eye opening 1106 under all PVT conditions, in order to ensure that a clock edge occurs after the end 1112 of the signal transition region 1104 and prior to the commencement of the transition region to the next symbol, even under worst case PVT effects. Difficulty can arise in designing a CDR circuit 1200 that guarantees a clock edge within the eye opening 1106 when the transmission frequency increases and timing skew of the difference signals 1202, 1204, 1206 is large compared to the UI 1302. For example, a typical delay element may produce a delay value that changes by a factor of 2 over all PVT conditions.

Figure 14:
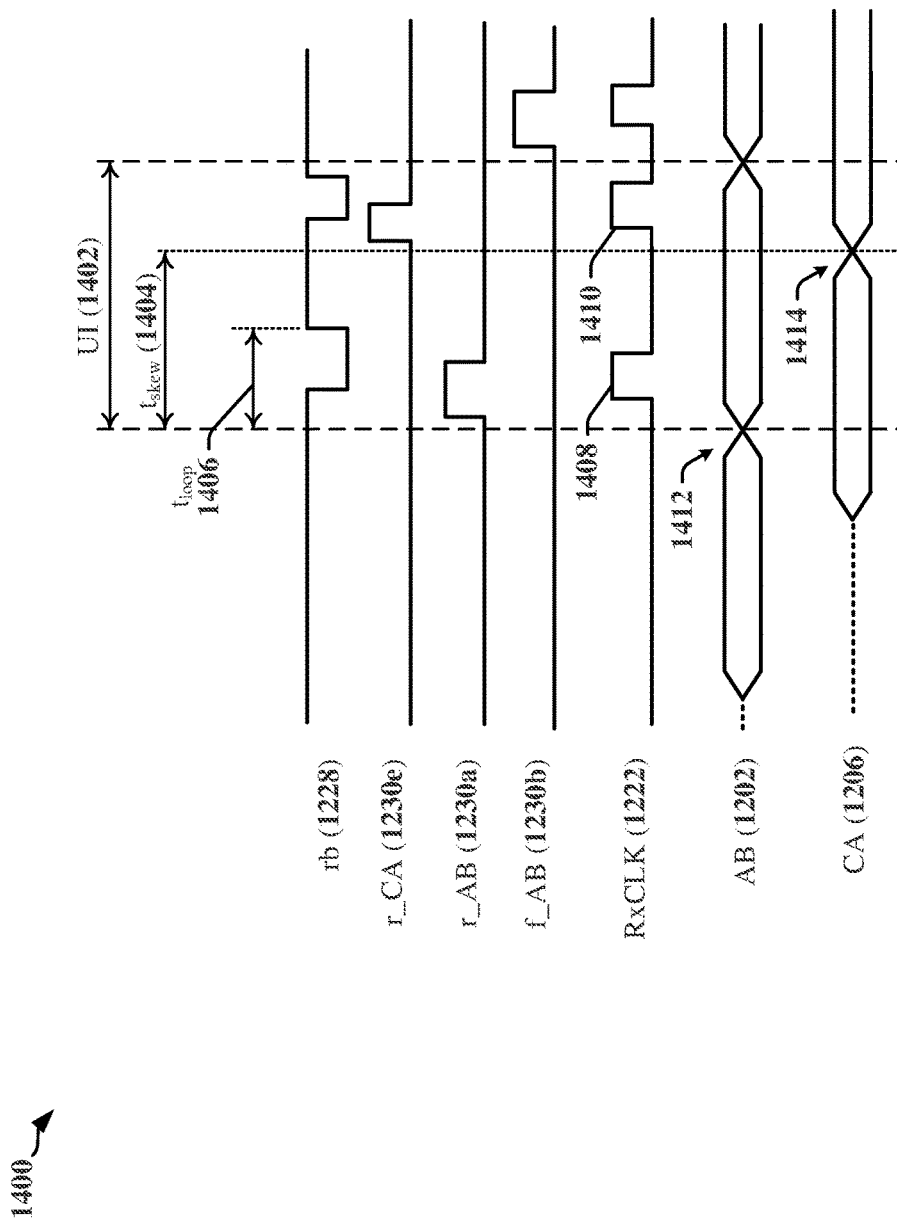
FIG. 14 illustrates timing associated with a CDR circuit that has a loop time that is shorter than the skew between signals transmitted on the C-PHY 3-Phase signal.

FIG. 14 is a timing diagram 1400 that illustrates the effect of a programmable delay element 1214 that provides an insufficient delay. In this example, $t_{loop}$ 1406 is too short for the observed $t_{skew}$ 1404, and multiple clock pulses 1408, 1410 are generated in one UI 1402. That is, the loop delay $t_{loop}$ 1406 is not big enough relative to $t_{skew}$ 1404, and later occurring transitions on the difference signals 1202, 1204, 1206 are not masked. In the depicted example, a second transition 1414 in one of the difference signals 1206 may be detected after a pulse 1408 has been generated in response to a first occurring transition 1412 in another of the difference signals 1202. In this example, the recovered clock frequency may be twice the clock frequency used to transmit symbols on the 3-phase interface.

Figure 15:
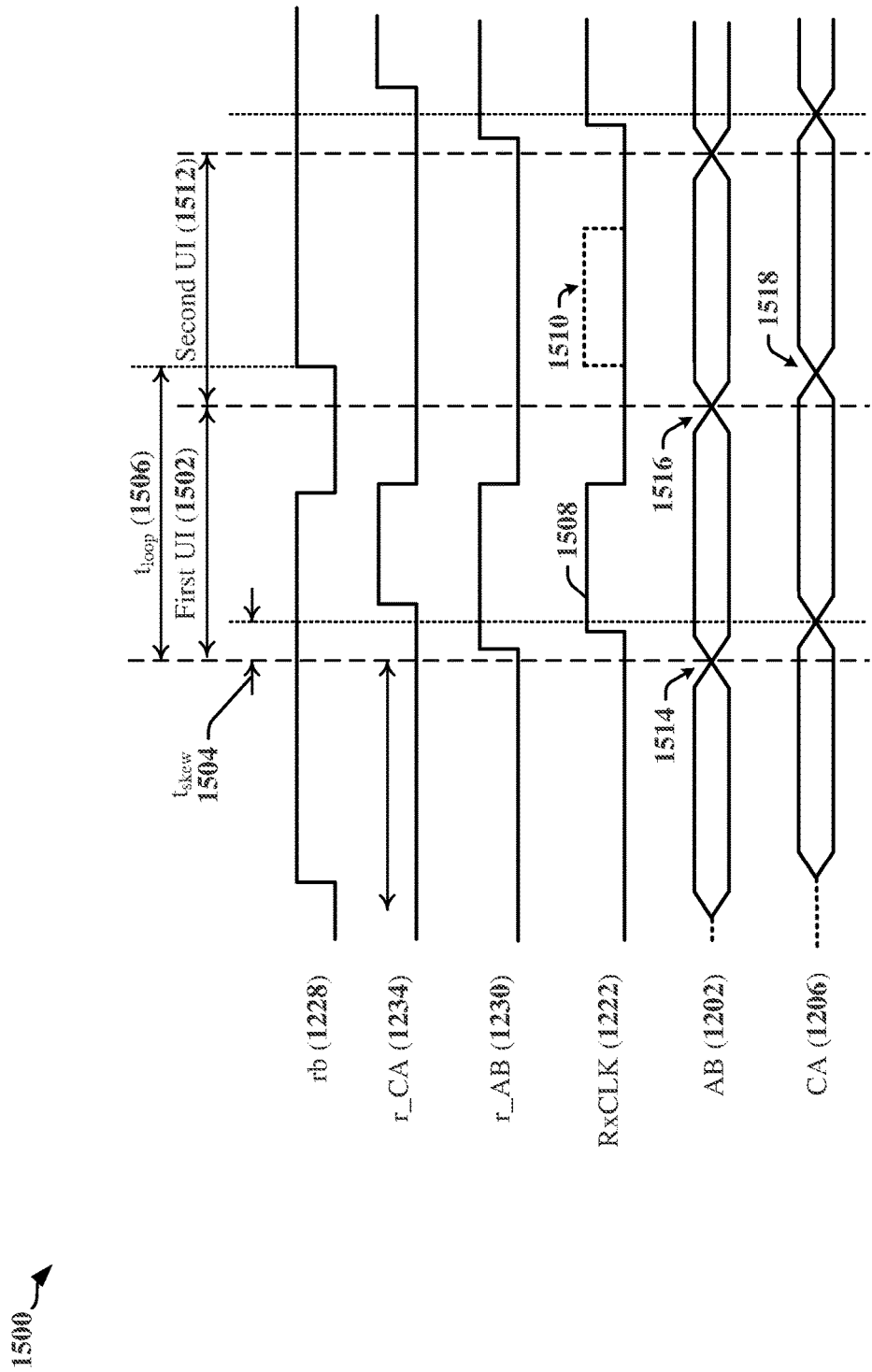
FIG. 15 illustrates timing associated with a CDR circuit that has a loop time that is longer than a symbol interval of the C-PHY 3-Phase signal.

FIG. 15 is a timing diagram 1500 that illustrates the effect of a programmable delay element 1214 that provides a delay that is too long. In this example, $t_{loop}$ 1506 is greater than the UI 1502. The CDR circuit 1200 may generate a clock pulse 1508 in response to a first-occurring transition 1514 in a first UI 1502, but the rb signal 1228 may be active when transitions 1516, 1518 occur in a second UI 1512, In the example depicted, the transitions 1516, 1518 in the second UI 1512 are masked, and the expected pulse 1510 corresponding to the second UI 1512 is suppressed. In this example, the recovered clock frequency may be half the clock frequency used to transmit symbols on the 3-phase interface.

As illustrated by the examples of FIGS. 14 and 15, the CDR circuit 1200 may be subject to the constraint:

$$t_{skew}<t_{loop}<UI.$$

Empirical evidence suggests that $t_{loop}$ 1320, 1406, 1506 is very sensitive to PVT. In some instances, the delay provided by the programmable delay element 1214 may be increased to accommodate the range of potential variations of PVT. As data rates increase, decreases and $t_{skew}$ increases proportionately with respect to the UI, reducing the potential range of delays available to configure the programmable delay element 1214.

Clock Generation for 3-Phase Interfaces Using Interpolated Pulses

According to certain aspects disclosed herein, a clock recovery circuit used in a multi-phase receiver can avoid issues associated with variations in PVT. A clock recovery circuit may be adapted to detect transitions in some UIs, and to suppress detection of transitions in other UIs. The clock recovery circuit may generate interpolated pulses for UIs in which transition detection is suppressed. In a first mode of operation, a programmed delay may be configured to cause a CDR circuit to suppress detection of transitions in a second-occurring UI after detecting a transition in first-occurring UI. In this first mode of operation, the CDR circuit generates a clock signal with a frequency that is half the frequency of the symbol transmission frequency. In a second mode of operation, the programmed delay may be configured to cause the CDR circuit to suppress detection of transitions in two succeeding UIs after detecting a transition in first-occurring UI. In the second mode of operation, the CDR circuit generates a clock signal with a frequency that is one-third of the frequency of the symbol transmission frequency. Other modes of operation may produce frequencies that are a quarter or less of the symbol frequency, etc. A delay-locked loop (DLL) may be used to generate clock pulses corresponding to UIs in which transition detection is suppressed. The clock pulses generated by the DLL may be inserted between pulses of the clock signal produced by the CDR circuit.

Figure 16:
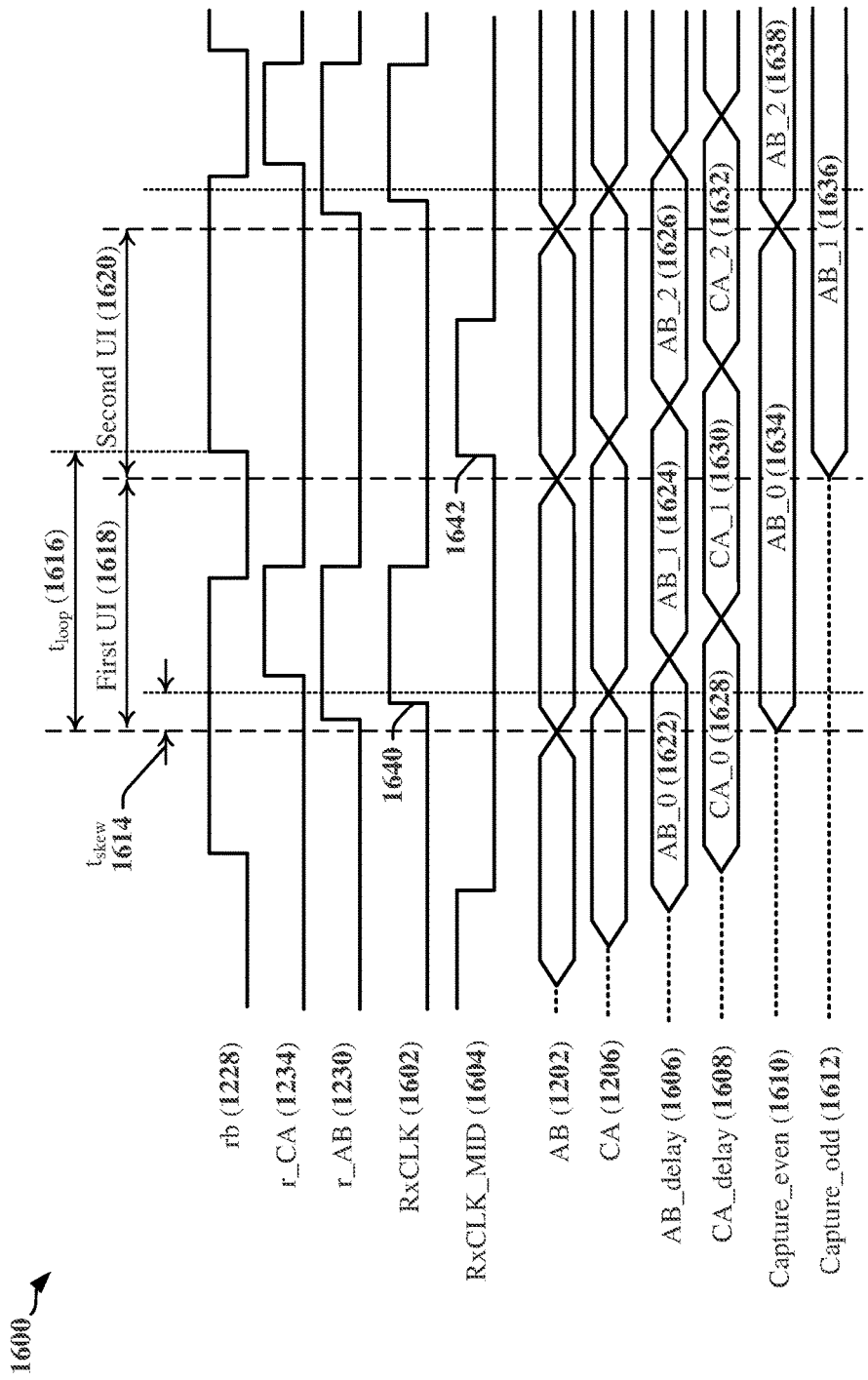
FIG. 16 is a timing diagram that illustrates the operation of a CDR adapted in accordance with certain aspects disclosed herein.

FIG. 16 is a timing diagram 1600 that illustrates clock generation in accordance with certain aspects disclosed herein. One or more programmable delay elements in a clock recovery circuit may be adapted, and/or configured with delays such that edge detection and pulse generation is suppressed in a proportion of UIs 1618, 1620. In the illustrated example, a pulse generating circuit or loop provides a clock pulse in an RxCLK signal 1602 for a first UI 1618, but does not detect the transitions in a second, succeeding UI 1620. The clock recovery circuit may include or cooperate with a DLL circuit that supplies a pulse 1642 corresponding to the second UI 1620 in an intermediate clock signal (RxCLK_MID) 1604. The pulse-generating circuit or loop may be configured to miss or ignore transitions in two or more UIs 1620 after generating the pulse 1640 in the first UI 1616, with one or more DLL circuits supplying pulses for the UIs 1620 during which pulse generation is suppressed when, for example, transitions are ignored. The pulses generated by the one or more DLLs may be positioned between, and with respect to rising edges of the RxCLK signal 1602. FIG. 16 illustrates a half-rate example in which the RxCLK_MID signal 1604 is generated with a 180-degree phase shift with respect to the RxCLK signal 1602.

The RxCLK signal 1602 and the RXCLK MID signal 1604 may be used to sample delayed versions of the difference signals 1202, 1204, 1206, including for example the AB_delay signal 1606, which is a delayed version of the AB difference signal 1202, and the CA_delay signal 1608, which is a delayed version of the CA difference signal 1206. The RxCLK signal 1602 captures even-occurring symbols 1622/1628, 1626/1632 to provide symbols 1634 and 1638 in the Capture_even signal 1610, while the RXCLK_MID signal 1604 captures odd-occurring symbols 1624/1630 to provide symbols 1636 in the Capture_odd signal 1612.

In some instances, the Capture_even signal 1610 and the Capture_odd signal 1612 can be re-aligned to the RxCLK signal 1602, for example, such that two or more of the symbols 1634, 1636, 1638, can be read in parallel.

Figure 17:
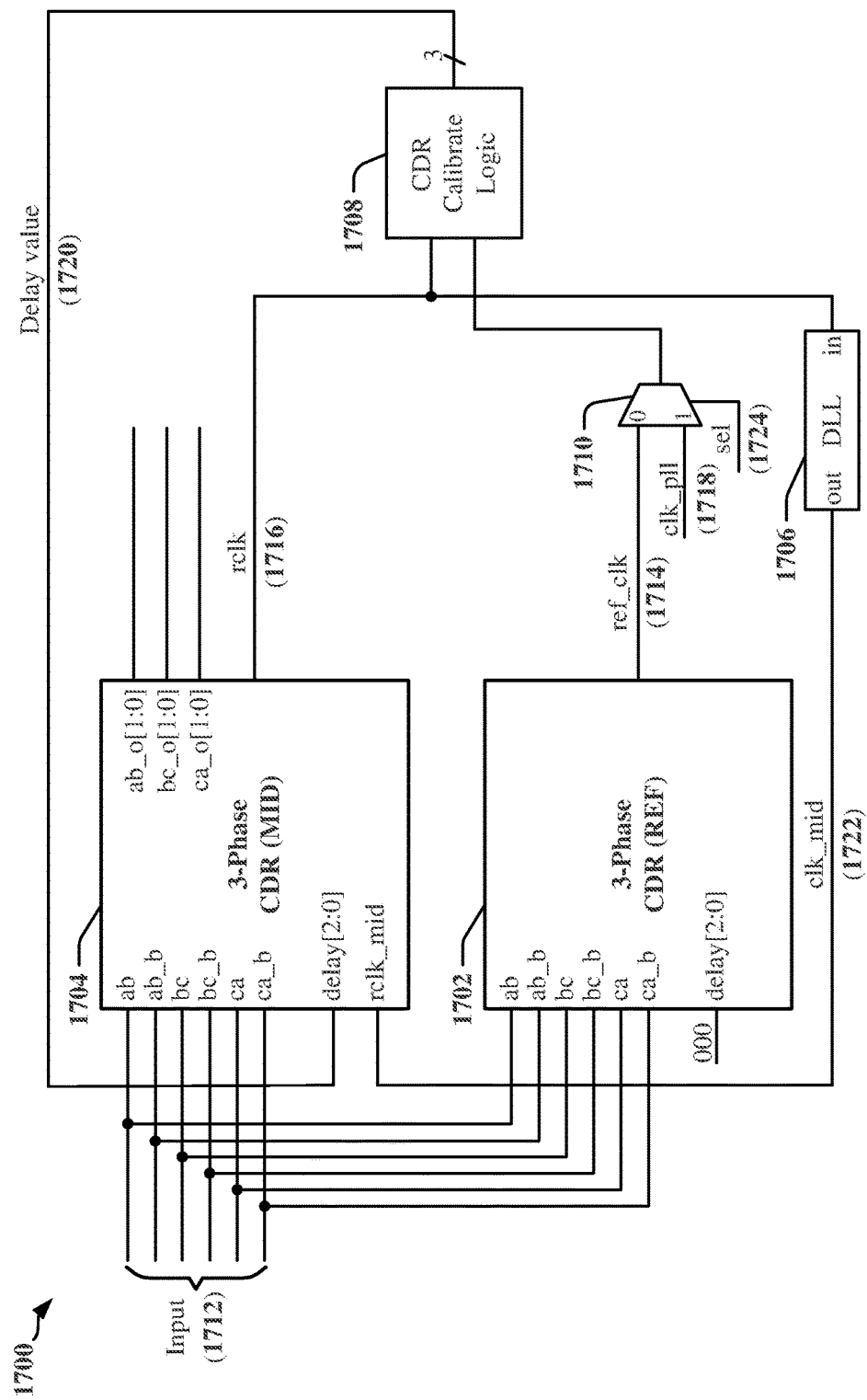
FIG. 17 illustrates an example of a clock generation circuit according to certain aspects disclosed herein.

FIG. 17 illustrates a circuit 1700 that can be used in accordance with the timing of FIG. 16 to reliably capture symbols transmitted on a 3-phase interface when the timing constraint $t_{skew} < t_{loop} < UI$ indicates that the reliability of clock recovery would otherwise be jeopardized. The circuit 1700 includes two CDR circuits 1702, 1704 and a DLL circuit 1706 that cooperate to produce a first clock (ref_clk) signal 1714 and a second clock signal (rclk) 1716 that can be used to capture symbols from an input 1712. In one example, the input 1712 may include the difference signals 1202, 1204, 1206 and inverted versions of the difference signals 1202, 1204, 1206. The ref_clk signal 1714 is generated using a first 3-phase CDR circuit 1702. The ref_clk signal 1714 may be provided as a reference clock having a frequency of $F_{ref}$ corresponding to the symbol transmission frequency of the 3-phase interface. The rclk signal 1716 is generated using a second CDR circuit 1704. In various modes of operation, the frequency of the rclk signal 1716 may be a multiple of the frequency of the ref_clk signal 1714 (i.e. $2 F_{ref}$, $1 F_{ref}$, $0.5 F_{ref}$, $\frac{1}{3} F_{ref}$, $0.25 F_{ref}$, etc.). The first CDR circuit 1702 and the second CDR circuit 1704 may have similar architectures.

CDR calibration logic 1708 may be provided to detect differences in the frequency of the rclk signal 1716 relative to the frequency of the ref_clk signal 1714. One or more programmable delay elements in the second CDR circuit 1704 may be calibrated based on the difference in frequencies of the rclk signal 1716 and the ref_clk signal 1714. In one example, the CDR calibration logic 1708 may provide a multi-bit control signal. The multi-bit control signal may define that defines a delay parameter 1720 that controls the duration of delays produced by the programmable delay element in the second CDR circuit 1704. The programmable delay element may be configured using a parameter that is selected to cause the second CDR circuit 1704 to suppress pulse generation in some proportion of the UIs 1618, 1620. The rclk signal 1716 is provided to the DLL circuit 1706, which produces additional pulses in the form of a phase-shifted signal 1722 that, when combined with pulses in the rclk signal 1716, can be used by the second CDR circuit 1704 to generate the parallel output data (ab_o[1:0], bc_o [1:0], ca_o[1:0].

The programmed delay in the second CDR circuit 1704 may be configured by adjusting the programmed delay while monitoring the frequency of the rclk signal 1716. Initially, the programmed delay may set to produce a delay that persists for a time that is less than the UI time (the time required to transmit one symbol). In one example, the clock recovery circuit may be configured to produce the rclk signal 1716 with a frequency equal to the symbol transmission frequency when a 3-phase signal is initially received. The value of the programmed delay may then be incrementally increased until the frequency of the rclk signal 1716 is divided by 2, by 3, or by any desired factor.

Figure 18:
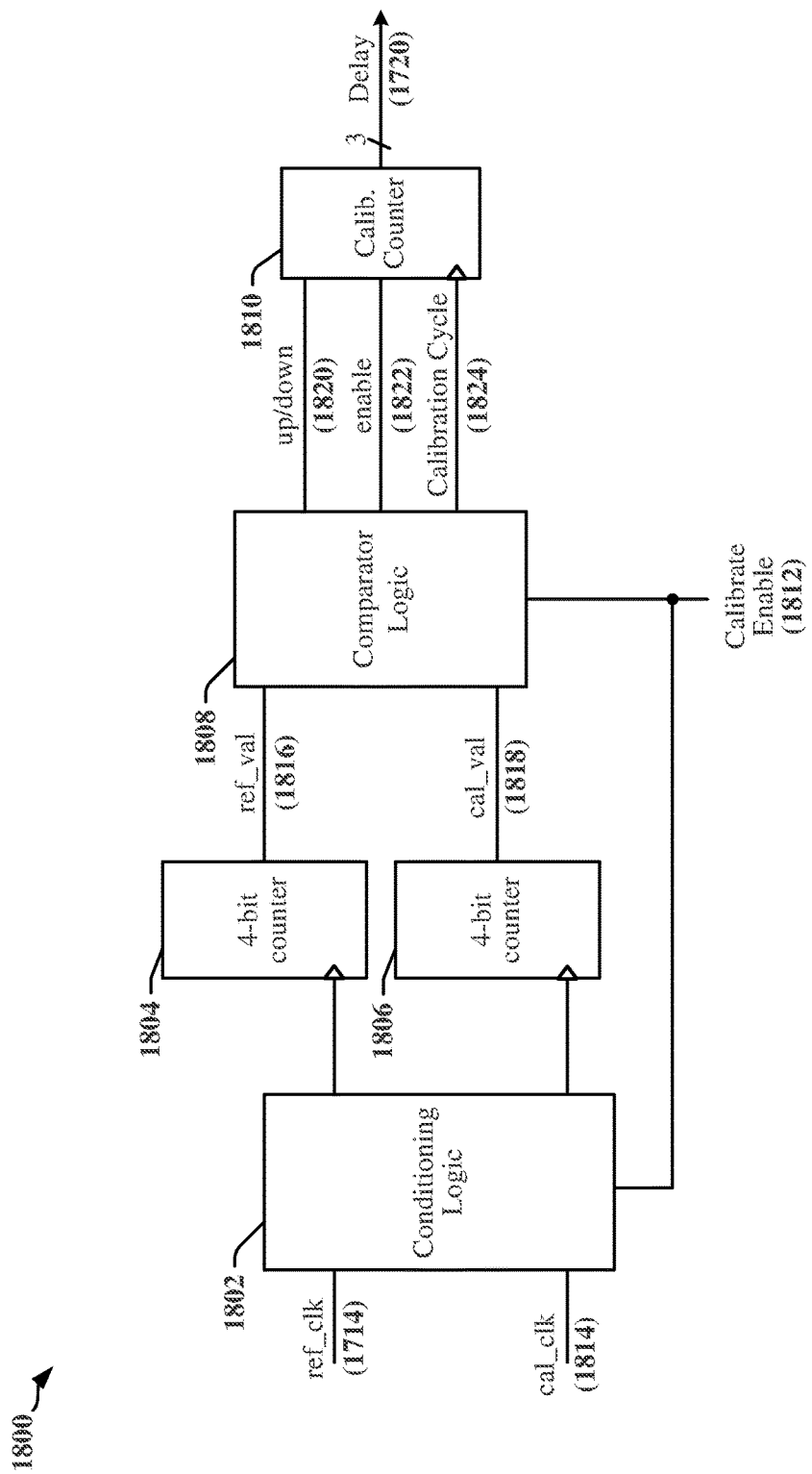
FIG. 18 illustrates one example of a circuit that may be used to calibrate a clock generation circuit provided in accordance with certain aspects disclosed herein.

FIG. 18 illustrates one example of a CDR calibration circuit 1800 used to configure the delay element of the second CDR circuit 1704. The CDR calibration circuit 1800 may be enabled by a signal 1812, which may be provided by a processing circuit. The CDR calibration circuit 1800 may include conditioning logic 1802 that is used to drive, and/or adjust timing of the ref_clk signal 1714 and a calibration clock (cal_clk) signal 1814. In one example, the ref_clk signal 1714 may be derived from a reference CDR circuit (e.g., the CDR circuit 1702), a free-running oscillator, a phase-locked loop, or other clock generation circuit. The CDR calibration circuit 1800 may include counters 1804 and 1806 that are clocked by conditioned versions of the ref_clk signal 1714 and the cal_clk signal 1814. The output of the counters 1804 and 1806 may be monitored by comparator logic 1808, which may determine the frequency of the ref_clk signal 1714 relative to the cal_clk signal 1814. A calibration counter 1810 may be adjusted during successive calibration cycles to control one or more programmable delay elements in a CDR circuit (e.g. the second CDR circuit 1704). The calibration counter 1810 may, for example, be incremented or decremented after each calibration cycle depending on a determination made by the comparator logic 1808. The comparator logic 1808 may control the calibration counter 1810 using one or more of an up/down signal 1818, an enable counter signal 1820, and a calibration cycle clock signal 1822.

Clock frequencies may be measured using the counters 1804, 1806. The counters 1804, 1806 may be incremented by the ref_clk signal 1714 and the cal_clk signal 1814 for a predetermined time period, which may be determined by the calibration cycle clock signal 1824 for example. A first counter 1804 may capture the number of clock cycles (ref_val) 1816 corresponding to the ref_clk signal 1714. In some instances, the first counter may be operated immediately after initialization to capture a ref_val 1816 that is a measure of the full-rate symbol transmission clock, and in some instances this initially-obtained ref_val 1816 may be registered or otherwise captured to be used for subsequent calibration cycles. A second counter 1804 counts the number of clock cycles (cal_val) 1818 that occur during a calibration cycle. The calibration cycle may be configured as a predetermined time period or may be an adjustable time period. For each calibration cycle, a delay parameter 1720 is provided to the CDR 1704 under calibration, and the frequency of the resultant cal_clk signal 1814 may be measured as the cal_val 1818 accumulated by the second counter 1806 during the calibration cycle. When the cal_val 1818 reflects a value that is a division of the clock frequency by the desired factor, the configuration is complete and the final value of the delay parameter 1720 may be used to operate the clock recovery circuit.

The second CDR circuit 1704 may be calibrated by incrementing or decrementing the delay parameter 1720 until a desired frequency for the cal_clk signal 1814. Changes in frequency may result in changes in cal_val 1818 and the comparator logic 1808 may continue calibration until a predefined difference between cal_val 1818 and ref_val 1816 is obtained. Calibration may commence with a low value for the delay parameter 1720 and the delay parameter 1720 may then be incremented for each calibration cycle. Calibration may commence with a high value for the delay parameter 1720 and the delay parameter 1720 may then be decremented for each calibration cycle.

According to certain aspects, a receiver may determine the nominal symbol transmission frequency of the C-PHY interface by adjusting delay elements of a CDR circuit until a training sequence is accurately received. A transmitter may send the training sequence during link initialization, prior to transmitting individual packets of data, after detection of an error at the receiver, and/or under application or system control. The receiver may monitor the C-PHY interface for activity, and may perform calibration upon detection of transitions. In some instances, the receiver may determine that the CDR circuit has already been calibrated and may perform calibration if the training sequence is not properly received.

In the example illustrated in FIG. 12, calibration commences when the programmable delay element 1214 is initialized to a predetermined value that enables the CDR circuit 1200 to detect the training sequence. The CDR circuit 1200 may be adapted according to certain aspects disclosed herein such that the programmable delay element 1214 may be adjusted to increase the duration of $t_{loop}$ 1616 (see FIG. 16) until errors are detected in the training sequence. The CDR circuit 1200 may be configured for normal operation with a programmable delay element 1214 with a value that is one or more increments lower than the value that caused errors to be detected in the training sequence.

Adaptive Edge Tracking in a C-PHY CDR Circuit

As clock rates used in C-PHY data links increase, clock generation circuits are required to produce sampling clocks that have edges with ever-decreasing timing tolerances to enable capture of signaling state for each transmission interval in which data is encoded. The half-rate clock generation architecture described herein can be configured or adapted to support increased symbol transmission rates. A half-rate clock generation circuit may detect every other transition to generate an edge in a first sampling clock and to generate a middle phase sampling clock by delaying edges from the first sampling clock. FIGS. 16-18 illustrate examples in which a clock may be generated in a 3-Phase interface at a receiver using interpolated pulses to provide a middle phase sampling clock. The position of the edges in the middle phase sampling clock are not optimized and can vary with changing process, voltage and temperature (PVT) conditions. PVT-related variations and/or other variations in the sampling clock may result in incorrectly sampled data over the PVT corners.

According to certain aspects disclosed herein, the half-rate architecture employed in a CDR circuit for a C-PHY interface can be further optimized using adaptive edge tracking. For example, the circuit 1700 of FIG. 17 provides a half-rate clock and data recovery architecture that may be vulnerable to certain variations in PVT. In some instances, the re-generated middle-phase sampling clock position may not be optimized, and edge timing in the middle-phase sampling clock can vary with PVT variations. Data received from a C-PHY interface typically does not exhibit such dependence on PVT, and the middle-phase sampling clock may sample wrong data over the PVT corners. According to certain aspects disclosed herein, the maximum delay used to generate this middle phase can be efficiently determined such that sampling margins are maximized and data is correctly and reliably sampled.

Figure 19:
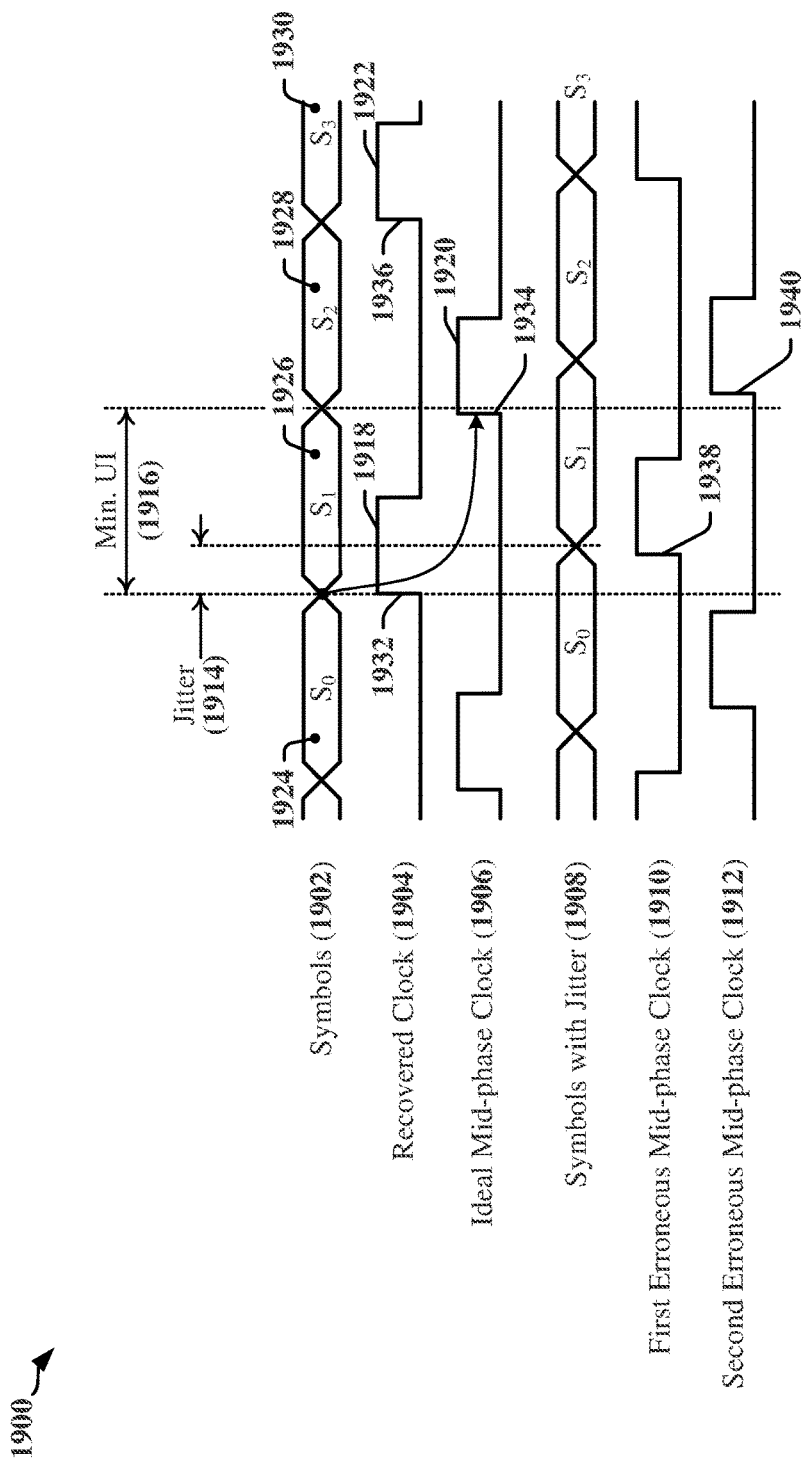
FIG. 19 is a timing diagram illustrating erroneous mid-phase timing in a half-rate clock generation circuit provided in accordance with certain aspects disclosed herein.

FIG. 19 is a timing diagram 1900 that illustrates certain potential effects of erroneous mid-phase timing in a half-rate clock generation circuit. Symbols 1902 received from a 3-phase signaling interface are used to generate a recovered clock signal 1904. In one example, the 3-phase signaling interface may be operated according to MIPI C-PHY specifications or protocols. A clock recovery circuit may provide pulses 1918, 1922 in the recovered clock signal 1904 that are generated from every other transition between symbols. For example, a first pulse 1918 is generated based on the transition between symbol $S_0$ 1924 and symbol $S_1$ 1926, while a second pulse 1922 is generated based on the transition between symbol $S_2$ 1928 and symbol $S_3$ 1930. An edge 1932 of the first pulse 1918 is used to sample symbol $S_0$ 1924, and an edge 1936 of the second pulse 1922 is used to sample symbol $S_2$ 1928. In ideal circumstances, a mid-phase clock signal 1906 generated from the recovered clock signal 1904 includes a third pulse 1920, where an edge 1934 can be used to sample symbol $S_1$ 1926.

PVT variations and other variations in operating conditions may affect delay elements and circuits used to generate the mid-phase clock signal 1906. Such variations may be exhibited or observed as an actual or apparent timing jitter in the received symbols 1902. FIG. 19 also illustrates an example of the effect of jitter on timing of symbols perceived at the receiver (see, symbols with jitter 1908). In the illustrated example, the ideal mid-phase clock signal 1906 may be able to reliably recover symbols 1902 from symbols with jitter 1908.

In some instances, PVT variations and other variations may affect timing of the mid-phase clock in a manner that prevents reliable sampling of the symbols 1902, 1908. In one example, a first erroneous mid-phase clock signal 1910 may have a shortened delay such that the edge 1938 used to sample symbol $S_1$ 1926 occurs within the region of jitter 1914 between the symbols 1902 and the symbols with jitter 1908. In another example, a second erroneous mid-phase clock signal 1912 may have a delay that causes the edge 1940 used to sample symbol $S_1$ 1926 to occur after the minimum UI 1916 of the symbols 1902. In both cases, an incorrect symbol may be sampled.

Figure 20:
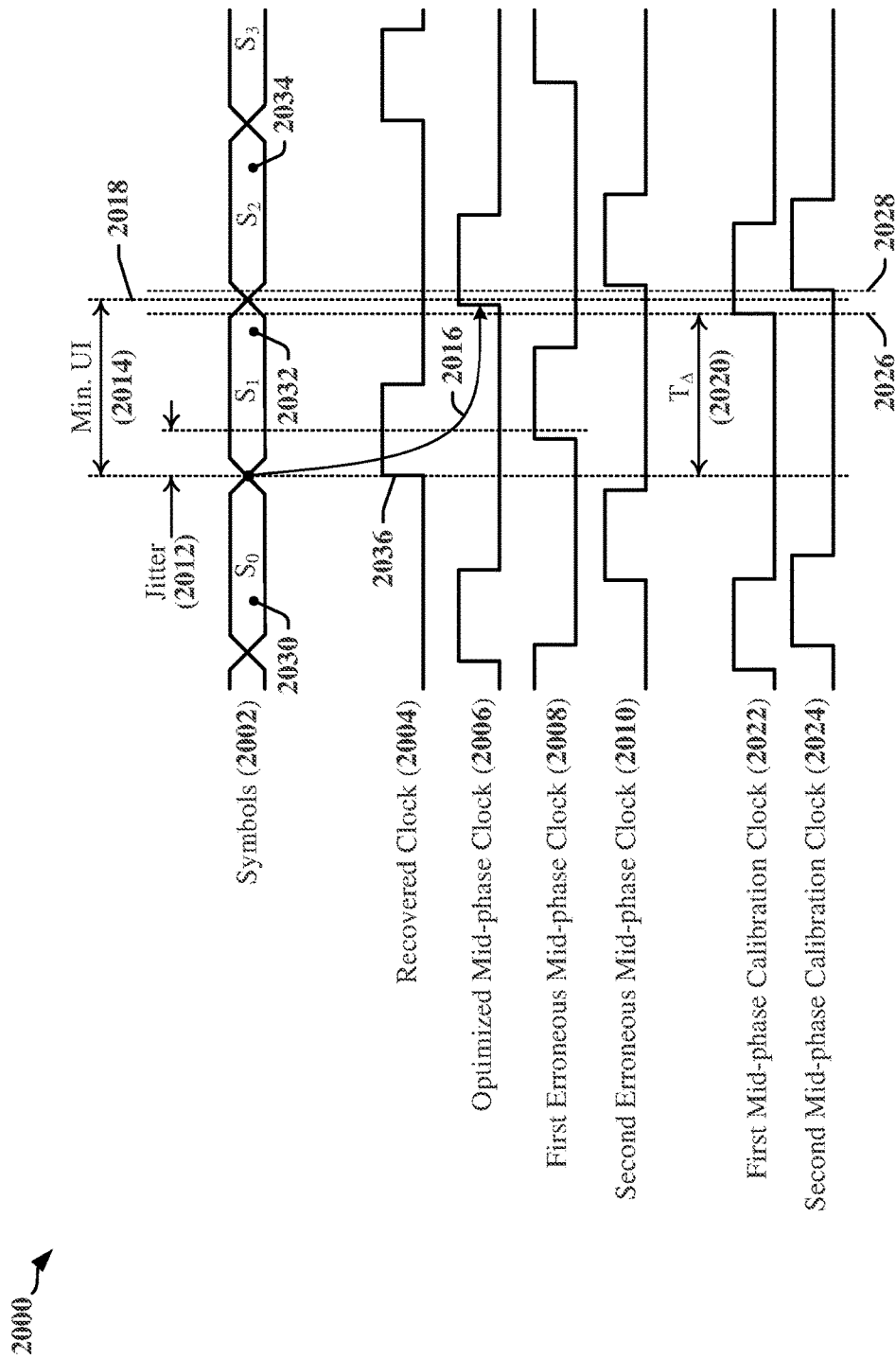
FIG. 20 is a timing diagram illustrating an example of a tracking and adaptive calibration technique provided in accordance with certain aspects disclosed herein.
Figure 21:
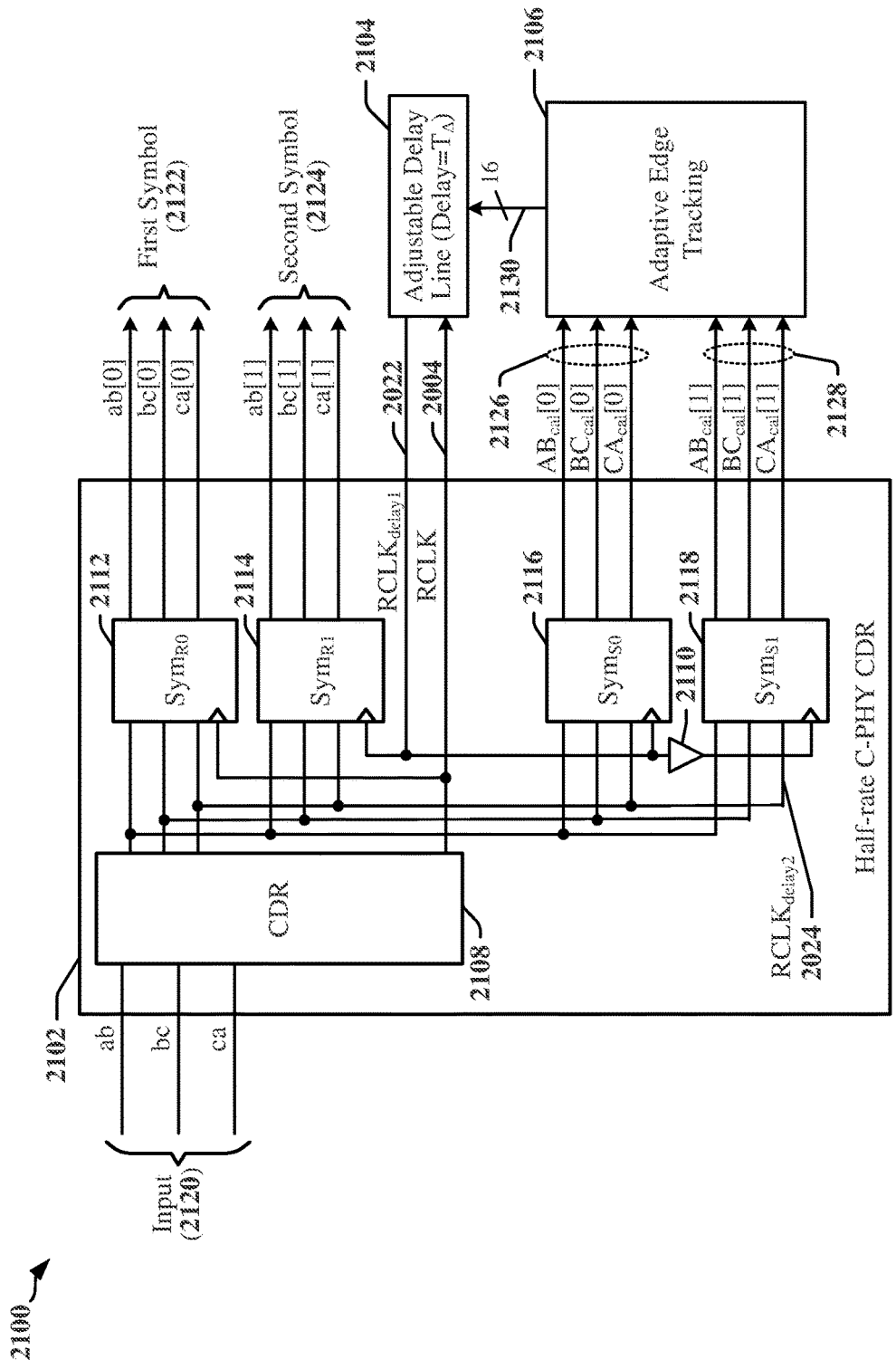
FIG. 21 illustrates an example of a circuit that can implement certain tracking and adaptive calibration techniques according to certain aspects disclosed herein.
Figure 22:
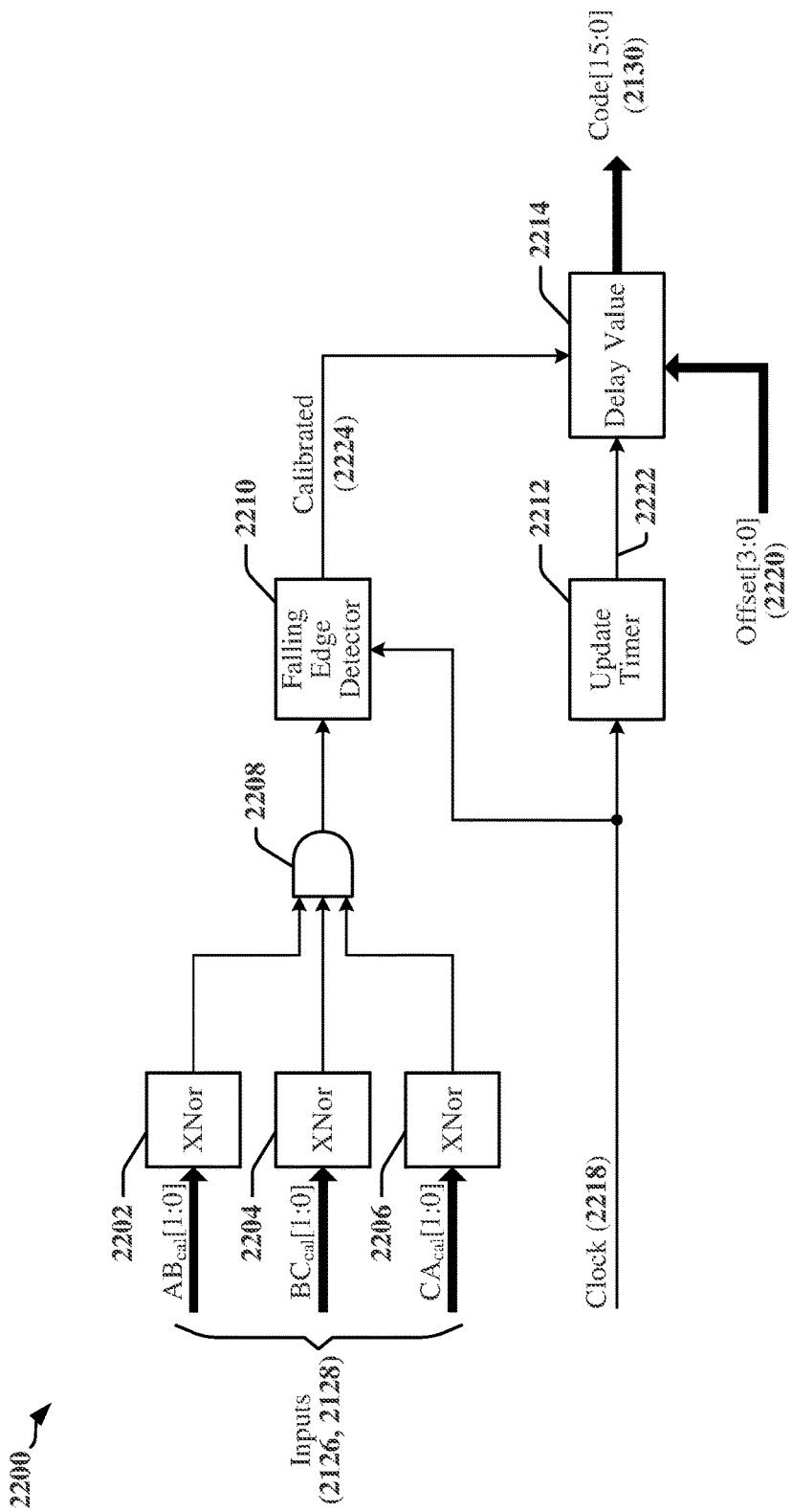
FIG. 22 illustrates one example of an adaptive calibration tracking circuit provided in accordance with certain aspects disclosed herein.

FIGS. 20-22 illustrate the tracking and adaptive calibration of edges in a mid-phase clock signal in accordance with certain aspects disclosed herein. According to certain aspects, two mid-phase calibration clock signals 2022, 2024 may be generated as delayed versions of the recovered clock signal 2004. Pulses in the recovered clock signal 2004 are used to sample every other symbol 2030, 2034. The mid-phase calibration clock signals 2022, 2024 may be used to configure an optimized mid-phase clock signal 2006. The optimized mid-phase clock signal 2006 may be used for sampling middle symbols 2032.

In the timing diagram of FIG. 20, the recovered clock signal 2004 is used to sample the first symbol 2030 in a pair of consecutively transmitted symbols 2030, 2032. For the purposes of calibration, data representative of the symbols 2002 recovered by the two mid-phase calibration clock signals 2022, 2024 may be compared. In a C-PHY interface, a pair of consecutively transmitted symbols 2030 and 2032 comprises two different symbols, and the two mid-phase calibration clock signals 2022, 2024 may be determined to straddle the transition between a pair of symbols 2030, 2032 when a difference exists between the data recovered by the two mid-phase calibration clock signals 2022, 2024. An adaptive edge tracking circuit may be employed to monitor differences (or lack of a difference) in symbol values sampled by the mid-phase calibration clock signals 2022, 2024, and the timing of the mid-phase calibration clock signals 2022, 2024 may be adjusted to maintain and optimize the mid-phase clock signal 2006 used to sample the second symbol 2032 in each pair of consecutively transmitted symbols 2030, 2032.

Referring now also to the circuit 2100 of FIG. 21, a three-phase interface may be adapted to generate a recovered clock signal 2004 (RCLK) and two mid-phase calibration clock signals 2022, 2024 in accordance with certain aspects disclosed herein. The mid-phase calibration clock signals 2022, 2024 ($RCLK_{delay1}$ and $RCLK_{delay2}$) are delayed versions of the recovered clock signal 2004, which is derived by a clock and data recovery circuit (CDR 2108) from transitions in signaling state detected at a receiver. The CDR 2108 may receive, as an input 2120, difference signals representative of the differences between each pair of wires in three wires that carry a 3-phase signal.

In one example, a first mid-phase calibration clock signal 2022 may be delayed using a programmable or configurable delay line 2104, and the second mid-phase calibration clock signal 2024 may be delayed with respect to first mid-phase calibration clock signal 2022 using a fixed delay. In the illustrated example, the fixed delay may be provided by one or more buffers, drivers or other types of delay element 2110. In another example, the delay between the two mid-phase calibration clock signals 2022, 2024 may be configured for calibration purposes. In another example, the second mid-phase calibration clock signal 2024 may be configured independently of the first mid-phase calibration clock signal 2022.

In the illustrated example, the recovered clock signal 2004 is used to sample the first symbol 2030 in a pair of consecutively transmitted symbols 2030/2032. The first mid-phase calibration clock signal 2022 ($RCLK_{delay1}$) may also serve as the optimized mid-phase clock signal 2006, after final adjustments have been made following calibration. In another example, the second mid-phase calibration clock signal 2024 ($RCLK_{delay2}$) can be used as the optimized mid-phase clock signal 2006, after final adjustments have been made following calibration. In other examples, the optimized mid-phase clock signal 2006 may be generated such that edges in the optimized mid-phase clock signal 2006 occur between corresponding edges in the two mid-phase calibration clock signals 2022, 2024. In some instances, the first mid-phase calibration clock signal 2022 may be delayed to obtain the optimized mid-phase clock signal 2006 and/or the second mid-phase calibration clock signal 2022 ($RCLK_{delay2}$) may be generated by delaying the optimized mid-phase clock signal 2006.

In the illustrated example, the two mid-phase calibration clock signals 2022, 2024 are derived by delaying the recovered clock signal 2004, which results in the two mid-phase calibration clock signals 2022, 2024 having a common delay ($T_A$ 2020). The common delay value $T_A$ 2020 may be characterized as the time elapsed between an edge 2036 in the recovered clock signal 2004 and a corresponding edge 2026 in the first mid-phase calibration clock signal 2022. The value of $T_A$ 2020 may be adjusted incrementally while symbol values sampled by the two mid-phase calibration clock signals 2022, 2024 are monitored and/or compared. Adaptive edge tracking logic and/or circuits 2106 can determine that a transition in signaling states on the communication link has occurred between the edges 2026 and 2028 of pulses on the two mid-phase calibration clock signals 2022, 2024. The value of $T_A$ 2020 may be adjusted incrementally until a difference in symbol values sampled by the two mid-phase calibration clock signals 2022, 2024 is detected. The value of $T_A$ 2020 may be further adjusted to obtain an optimized mid-phase clock signal 2006. In some instances, the value of $T_A$ 2020 is adjusted by incrementing the delay. In other instances, the value of $T_A$ 2020 is adjusted by decrementing the delay. In some examples, the optimized mid-phase clock signal 2006 is generated such that edges in the optimized mid-phase clock signal 2006 occur between edges on the two mid-phase calibration clock signals 2022, 2024.

FIG. 22 illustrates one example of an adaptive edge tracking circuit 2200. The adaptive edge tracking circuit 2200 may be used to implement certain of the functions associated with the adaptive edge tracking logic and/or circuits 2106 illustrated in FIG. 21. In operation, symbols captured using the two mid-phase calibration clock signals 2022, 2024 are provided to exclusive-NOR logic elements 2202, 2204, 2206. Each element compares one of the difference signals 2126 captured using the first mid-phase calibration clock signal 2022 with a corresponding one of the difference signals 2128 captured using the second mid-phase calibration clock signal 2024. The outputs of the exclusive-NOR logic elements 2202, 2204, 2206 are provided to an AND gate 2208 that provides a logic 1 output when all inputs are set to logic 1, indicating that the symbols captured using the two mid-phase calibration clock signals 2022, 2024 have identical values. A falling edge detection circuit 2210 monitors the output of the AND gate 2208, and provides an output 2224 that indicates when the output of the AND gate 2208 has transitioned to logic 0, indicating the symbols captured using the two mid-phase calibration clock signals 2022, 2024 have different values, and that calibration may have been accomplished. The falling edge detection circuit 2210 is typically synchronized using a system clock signal 2218. In some examples, the falling edge detection circuit 2210 may be configured to ignore short, transitory periods when the output of the AND gate 2208 has a logic 0 value.

In certain examples, the value of $T_A$ 2020 is initially set to a low value that is expected to cause the two mid-phase calibration clock signals 2022, 2024 to sample the same symbol (e.g. symbol $S_1$ 1926). The symbol $S_1$ 1926 is also captured by the recovered clock signal 2004. In some examples, the initial value of $T_A$ 2020 is set to zero to guarantee that the two mid-phase calibration clock signals 2022, 2024 sample the same symbol. In other examples, a receiver may be configured with one or more initialization values that are known to cause the two mid-phase calibration clock signals 2022, 2024 to initially sample symbol $S_1$ 1926 under all PVT conditions and for all known symbol rates available for the communication interface. The value of $T_A$ 2020 may be configured or maintained as a delay value to be loaded into a counter 2214 or programmable register. The initial value of $T_A$ 2020 may be provided as an offset value 2220 to the counter 2214. In one example, the counter 2214 outputs a 16-bit code word 2130 that is provided to the configurable delay line 2104 (see FIG. 21).

The counter 2214 may be enabled when the output 2224 of the falling edge detection circuit 2210 indicates that calibration has not been accomplished. The counter 2214 may be clocked at preconfigured or programmed intervals using an update timer 2212, counter or other such device. The update timer 2212 may be clocked by the system clock signal 2218 to produce a clocking signal 2222 calibration cycle with a desired period.

The counter 2214 may be disabled when the output 2224 of the falling edge detection circuit 2210 indicates that calibration has been accomplished. Calibration may be determined to have been accomplished when different symbol values are captured using the two mid-phase calibration clock signals 2022, 2024. The output 2224 of the falling edge detection circuit 2210 may be used to disable the counter after calibration has been achieved.

Examples of Processing Circuits and Methods

Figure 23:
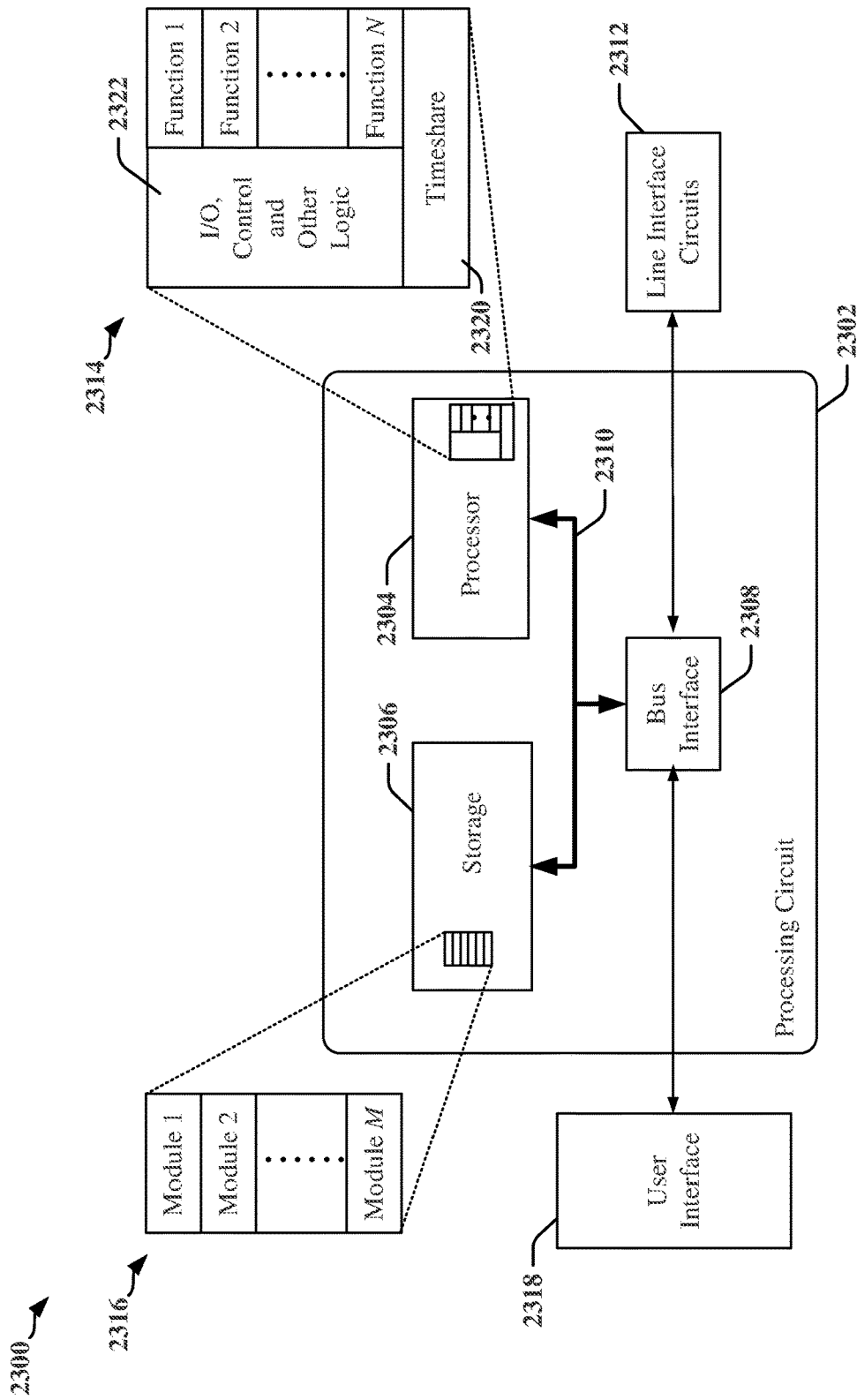
FIG. 23 illustrates an example of an apparatus employing a processing circuit that may be adapted according to certain aspects disclosed herein.

FIG. 23 is a conceptual diagram 2300 illustrating an example of a hardware implementation for an apparatus employing a processing circuit 2302 that may be configured to perform one or more functions disclosed herein. In accordance with various aspects of the disclosure, an element, or any portion of an element, or any combination of elements as disclosed herein may be implemented using the processing circuit 2302. The processing circuit 2302 may include one or more processors 2304 that are controlled by some combination of hardware and software modules. Examples of processors 2304 include microprocessors, microcontrollers, digital signal processors (DSPs), field programmable gate arrays (FPGAs), programmable logic devices (PLDs), state machines, sequencers, gated logic, discrete hardware circuits, and other suitable hardware configured to perform the various functionality described throughout this disclosure. The one or more processors 2304 may include specialized processors that perform specific functions, and that may be configured, augmented or controlled by one of the software modules 2316. The one or more processors 2304 may be configured through a combination of software modules 2316 loaded during initialization, and further configured by loading or unloading one or more software modules 2316 during operation.

In the illustrated example, the processing circuit 2302 may be implemented with a bus architecture, represented generally by the bus 2310. The bus 2310 may include any number of interconnecting buses and bridges depending on the specific application of the processing circuit 2302 and the overall design constraints. The bus 2310 links together various circuits including the one or more processors 2304, and storage 2306. Storage 2306 may include memory devices and mass storage devices, and may be referred to herein as computer-readable media and/or processor-readable media. The bus 2310 may also link various other circuits such as timing sources, timers, peripherals, voltage regulators, and power management circuits. A bus interface 2308 may provide an interface between the bus 2310 and one or more transceivers 2312. A transceiver 2312 may be provided for each networking technology supported by the processing circuit. In some instances, multiple networking technologies may share some or all of the circuitry or processing modules found in a transceiver 2312. Each transceiver 2312 provides a means for communicating with various other apparatus over a transmission medium. Depending upon the nature of the apparatus, a user interface 2318 (e.g., keypad, display, speaker, microphone, joystick) may also be provided, and may be communicatively coupled to the bus 2310 directly or through the bus interface 2308.

A processor 2304 may be responsible for managing the bus 2310 and for general processing that may include the execution of software stored in a computer-readable medium that may include the storage 2306. In this respect, the processing circuit 2302, including the processor 2304, may be used to implement any of the methods, functions and techniques disclosed herein. The storage 2306 may be used for storing data that is manipulated by the processor 2304 when executing software, and the software may be configured to implement any one of the methods disclosed herein.

One or more processors 2304 in the processing circuit 2302 may execute software. Software shall be construed broadly to mean instructions, instruction sets, code, code segments, program code, programs, subprograms, software modules, applications, software applications, software packages, routines, subroutines, objects, executables, threads of execution, procedures, functions, algorithms, etc., whether referred to as software, firmware, middleware, microcode, hardware description language, or otherwise. The software may reside in computer-readable form in the storage 2306 or in an external computer readable medium. The external computer-readable medium and/or storage 2306 may include a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a "flash drive," a card, a stick, or a key drive), a random access memory (RAM), a ROM, a PROM, an erasable PROM (EPROM), an EEPROM, a register, a removable disk, and any other suitable medium for storing software and/or instructions that may be accessed and read by a computer. The computer-readable medium and/or storage 2306 may also include, by way of example, a carrier wave, a transmission line, and any other suitable medium for transmitting software and/or instructions that may be accessed and read by a computer. Computer-readable medium and/or the storage 2306 may reside in the processing circuit 2302, in the processor 2304, external to the processing circuit 2302, or be distributed across multiple entities including the processing circuit 2302. The computer-readable medium and/or storage 2306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The storage 2306 may maintain software maintained and/or organized in loadable code segments, modules, applications, programs, etc., which may be referred to herein as software modules 2316. Each of the software modules 2316 may include instructions and data that, when installed or loaded on the processing circuit 2302 and executed by the one or more processors 2304, contribute to a run-time image 2314 that controls the operation of the one or more processors 2304. When executed, certain instructions may cause the processing circuit 2302 to perform functions in accordance with certain methods, algorithms and processes described herein.

Some of the software modules 2316 may be loaded during initialization of the processing circuit 2302, and these software modules 2316 may configure the processing circuit 2302 to enable performance of the various functions disclosed herein. For example, some software modules 2316 may configure internal devices and/or logic circuits 2322 of the processor 2304, and may manage access to external devices such as the transceiver 2312, the bus interface 2308, the user interface 2318, timers, mathematical coprocessors, and so on. The software modules 2316 may include a control program and/or an operating system that interacts with interrupt handlers and device drivers, and that controls access to various resources provided by the processing circuit 2302. The resources may include memory, processing time, access to the transceiver 2312, the user interface 2318, and so on.

One or more processors 2304 of the processing circuit 2302 may be multifunctional, whereby some of the software modules 2316 are loaded and configured to perform different functions or different instances of the same function. The one or more processors 2304 may additionally be adapted to manage background tasks initiated in response to inputs from the user interface 2318, the transceiver 2312, and device drivers, for example. To support the performance of multiple functions, the one or more processors 2304 may be configured to provide a multitasking environment, whereby each of a plurality of functions is implemented as a set of tasks serviced by the one or more processors 2304 as needed or desired. In one example, the multitasking environment may be implemented using a timesharing program 2320 that passes control of a processor 2304 between different tasks, whereby each task returns control of the one or more processors 2304 to the timesharing program 2320 upon completion of any outstanding operations and/or in response to an input such as an interrupt. When a task has control of the one or more processors 2304, the processing circuit is effectively specialized for the purposes addressed by the function associated with the controlling task. The timesharing program 2320 may include an operating system, a main loop that transfers control on a round-robin basis, a function that allocates control of the one or more processors 2304 in accordance with a prioritization of the functions, and/or an interrupt driven main loop that responds to external events by providing control of the one or more processors 2304 to a handling function.

Figure 24:
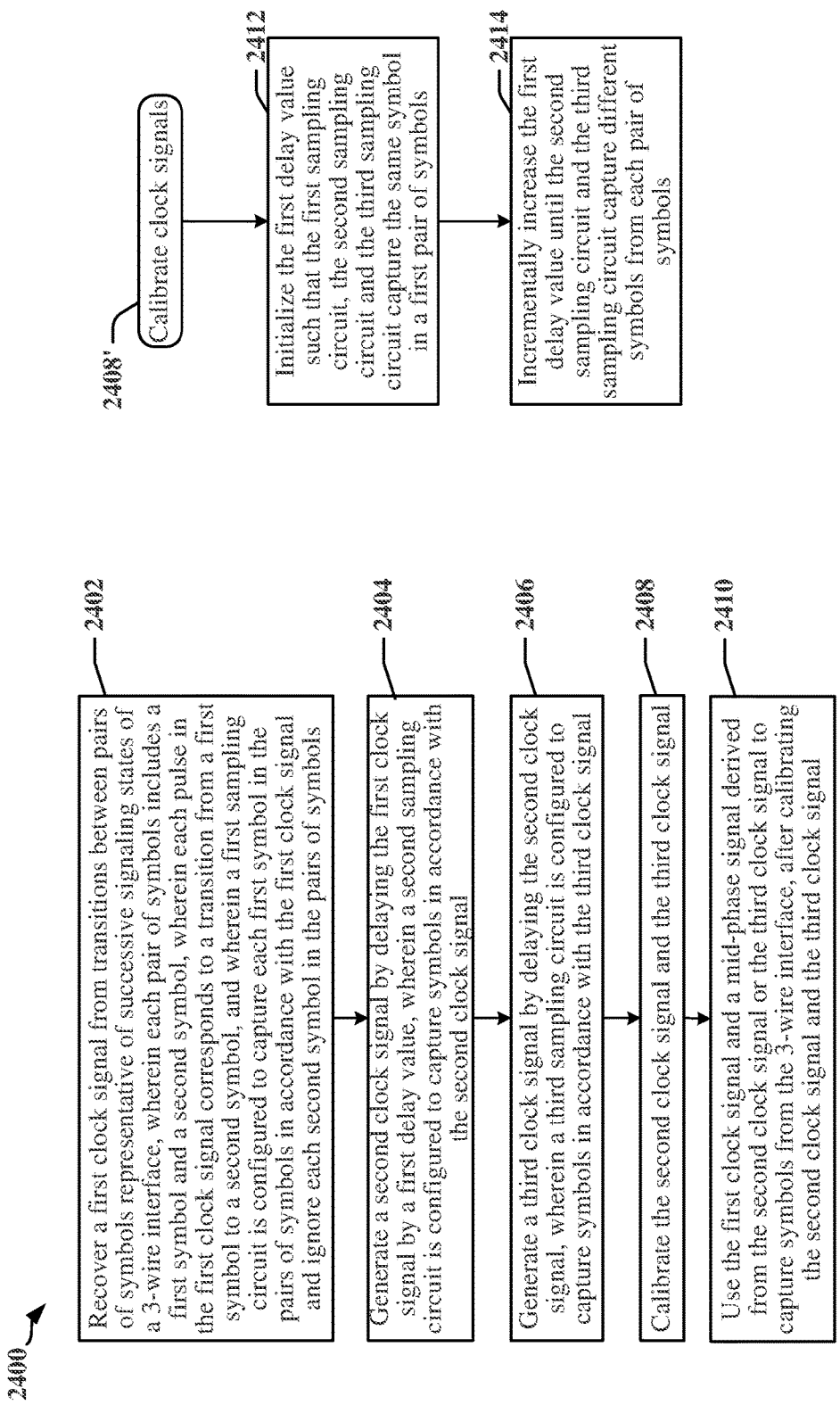
FIG. 24 is a flow chart of a method of clock calibration according to certain aspects disclosed herein.

FIG. 24 is a flow chart 2400 of a method calibrating a clock recovery circuit that may be performed by a receiver circuit in an apparatus coupled to a C-PHY 3-Phase interface.

At block 2402, the receiver circuit may recover a first clock signal from transitions between pairs of symbols representative of successive signaling states of a 3-wire interface. Each pair of symbols includes a first symbol and a second symbol. Each pulse in the first clock signal corresponds to a transition from a first symbol to a second symbol. A first sampling circuit may be configured to capture each first symbol in the pairs of symbols in accordance with the first clock signal and ignore each second symbol in the pairs of symbols.

At block 2404, the receiver circuit may generate a second clock signal by delaying the first clock signal by a first delay value. A second sampling circuit may be configured to capture symbols in accordance with the second clock signal.

At block 2406, the receiver circuit may generate a third clock signal by delaying the second clock signal. A third sampling circuit may be configured to capture symbols in accordance with the third clock signal.

At block 2408, the receiver circuit may calibrate the second clock signal and the third clock signal. On example of rate the second clock signal and the third clock signal is illustrated starting at block 2408'. At block 2412, the receiver circuit may initialize the first delay value such that the first sampling circuit, the second sampling circuit and the third sampling circuit capture the same symbol in a first pair of symbols. At block 2414, the receiver circuit may incrementally increase the first delay value until the second sampling circuit and the third sampling circuit capture different symbols from each pair of symbols.

At block 2410, the receiver circuit may use the first clock signal and a mid-phase signal derived from the second clock signal or the third clock signal to capture symbols from the 3-wire interface after calibrating the second clock signal and the third clock signal.

In one example, the receiver circuit may incrementally increase the first delay value after calibrating the second clock signal and the third clock signal. The receiver circuit may provide the second clock signal as the mid-phase signal.

In another example, the receiver circuit may incrementally decrease the first delay value after calibrating the second clock signal and the third clock signal. The receiver circuit may provide the third clock signal as the mid-phase signal.

In some examples, the receiver circuit may generate the mid-phase signal by delaying the second clock signal. The third clock signal may be generated by generating the mid-phase signal by delaying the second clock signal, and providing the third clock signal by delaying the mid-phase signal.

In certain examples, calibrating the second clock signal and the third clock signal includes configuring a programmable delay circuit.

In some examples, initializing the first delay value may include selecting an initial value for the first delay value configured to cause the second sampling circuit and the third sampling circuit to capture the same symbol in the first pair of symbols for all expected frequencies of the first clock signal the first delay value. Initializing may include selecting an initial value for the first delay value configured to cause the second sampling circuit and the third sampling circuit to capture the same symbol in the first pair of symbols for expected variations in manufacturing process, circuit supply voltage, and die temperature. Initializing the first delay value may include zeroing the first delay value.

In various aspects, a 3-phase signal is transmitted on each wire of the 3-wire interface and the 3-phase signal transmitted on each wire of the 3-wire interface is 120 degrees out-of-phase with each other wire in the 3-wire interface.

Figure 25:
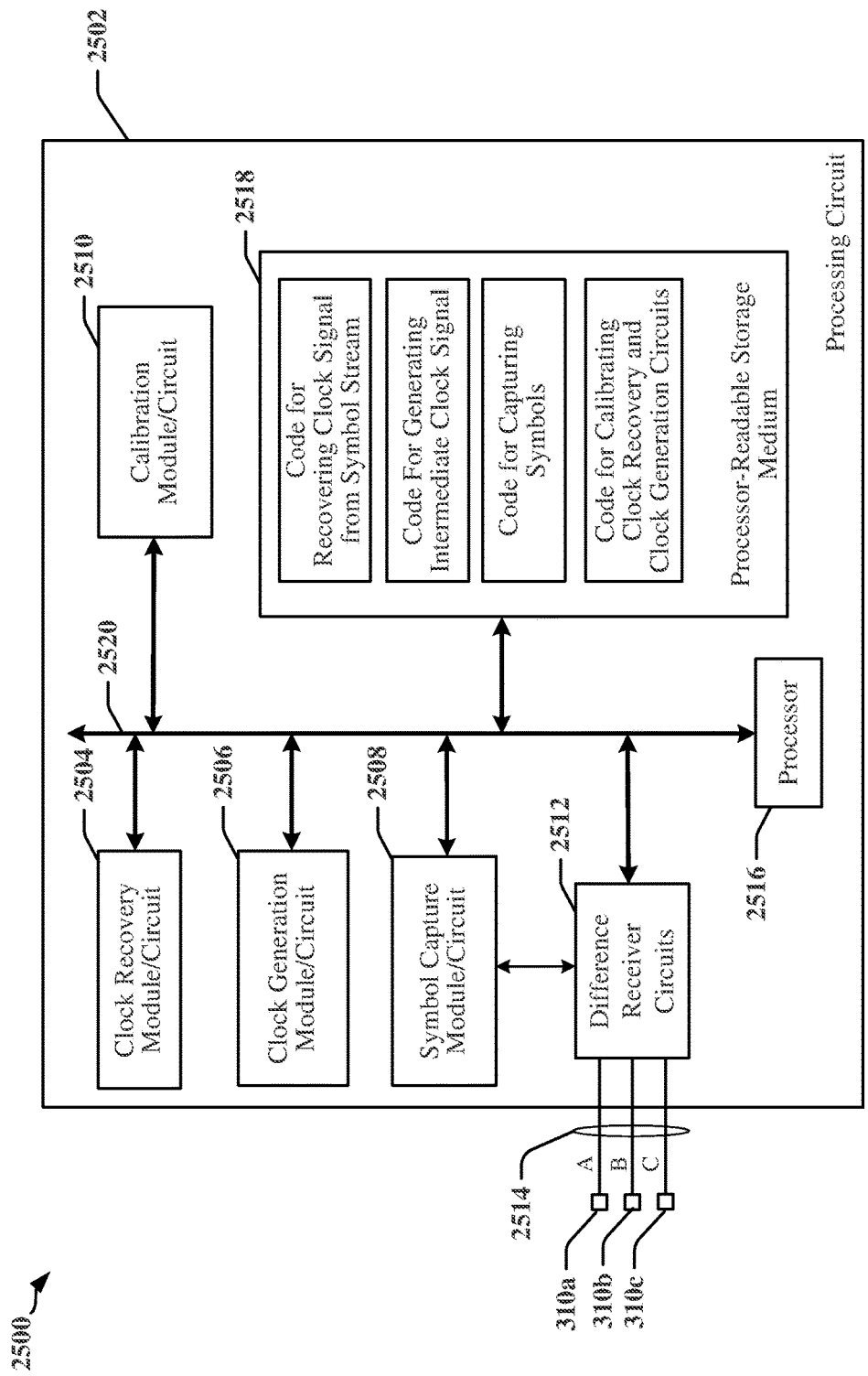
FIG. 25 is a diagram illustrating an example of a hardware implementation for an apparatus that can perform clock calibration in accordance with certain aspects disclosed herein.

FIG. 25 is a diagram illustrating an example of a hardware implementation for an apparatus 2500 employing a processing circuit 2502. The processing circuit typically has a processor 2516 that may include one or more of a microprocessor, microcontroller, digital signal processor, a sequencer and a state machine. The processing circuit 2502 may be implemented with a bus architecture, represented generally by the bus 2520. The bus 2520 may include any number of interconnecting buses and bridges depending on the specific application of the processing circuit 2502 and the overall design constraints. The bus 2520 links together various circuits including one or more processors and/or hardware modules, represented by the processor 2516, the modules or circuits 2504, 2506, 2508 and 2510, difference receiver circuits 2512 that determine difference signaling state between different pairs of the connectors or wires 2514 and the computer-readable storage medium 2518. The bus 2520 may also link various other circuits such as timing sources, peripherals, voltage regulators, and power management circuits, which are well known in the art, and therefore, will not be described any further.

The processor 2516 is responsible for general processing, including the execution of software stored on the computer-readable storage medium 2518. The software, when executed by the processor 2516, causes the processing circuit 2502 to perform the various functions described supra for any particular apparatus. The computer-readable storage medium 2518 may also be used for storing data that is manipulated by the processor 2516 when executing software, including data decoded from symbols transmitted over the connectors or wires 2514, which may be configured as data lanes and clock lanes. The processing circuit 2502 further includes at least one of the modules 2504, 2506, 2508 and 2510. The modules 2504, 2506, 2508 and 2510 may be software modules running in the processor 2516, resident/stored in the computer-readable storage medium 2518, one or more hardware modules coupled to the processor 2516, or some combination thereof. The modules 2504, 2506, 2508 and/or 2510 may include microcontroller instructions, state machine configuration parameters, or some combination thereof.

In one configuration, the apparatus 2500 may be configured for data communication over a C-PHY 3-phase interface. The apparatus 2500 may include a module and/or circuit 2504 that is configured to recover a first clock signal from transitions between pairs of symbols representative of successive signaling states of a 3-wire interface, wherein each pair of symbols includes a first symbol and a second symbol, wherein each pulse in the first clock signal corresponds to a transition from a first symbol to a second symbol.

The apparatus 2500 may include a module and/or circuit 2506 that is configured to generate clock signals. The module and/or circuit 2504 may include a first delay element that produces a configurable first delay period, and is adapted to generate a second clock signal by delaying the first clock signal by the first delay period, and a second delay element configured to generate a third clock signal by delaying the second clock signal. The first delay element may include a programmable delay line.

The apparatus 2500 may include a module and/or circuit 2508 that is configured to means for capturing symbols. The module and/or circuit 2508 may include a first sampling circuit adapted to capture each first symbol in the pairs of symbols in accordance with the first clock signal and further configured to ignore each second symbol in the pairs of symbols, a second sampling circuit adapted to capture symbols in the pairs of symbols in accordance with the second clock signal, and a third sampling circuit adapted to capture symbols in the pairs of symbols in accordance with the third clock signal.

The apparatus 2500 may include a module and/or circuit 2510 that is configured to calibrate the second clock signal and the third clock signal. The module and/or circuit 2510 may be configured to initialize the first delay period such that the first sampling circuit, the second sampling circuit and the third sampling circuit capture the same symbol in a first pair of symbols, and incrementally increase the first delay period until the second sampling circuit and the third sampling circuit capture different symbols from each pair of symbols.

The module and/or circuit 2508 that is configured to means for capturing symbols may be configured to use the first clock signal and a mid-phase signal derived from the second clock signal or the third clock signal to capture symbols from the 3-wire interface after the second clock signal and the third clock signal have been calibrated.

In one example, the module and/or circuit 2510 that is configured to calibrate the second clock signal and the third clock signal may be configured to incrementally modify the first delay period after calibrating the second clock signal and the third clock signal to obtain the mid-phase signal.

In some examples, the module and/or circuit 2510 that is configured to calibrate the second clock signal and the third clock signal may be configured to select an initial period for the first delay period configured to cause the second sampling circuit and the third sampling circuit to capture the same symbol in the first pair of symbols for expected variations in manufacturing process, circuit supply voltage, and die temperature.

In some aspects, a 3-phase signal is transmitted on each wire of the 3-wire interface and the 3-phase signal transmitted on each wire of the 3-wire interface is 120 degrees out-of-phase with each other wire in the 3-wire interface. In one example, the 3-wire interface may be operated in accordance with MIPI C-PHY specifications and/or protocols.

In various examples, the apparatus is a clock recovery apparatus that includes a plurality of difference receivers coupled to a 3-wire interface, a clock recovery circuit configured to provide a first clock signal that includes pulses corresponding to transitions between pairs of symbols representative of successive signaling states of outputs of the difference receivers. Each pair of symbols may have a first symbol and a second symbol. Each pulse in the first clock signal may correspond to a transition from a first symbol to a second symbol.

The clock recovery apparatus may include a first sampling circuit configured to capture each first symbol in the pairs of symbols in accordance with timing of pulses in the first clock signal and ignore each second symbol in the pairs of symbols. In one example, the clock recovery apparatus includes a first delay element that provides a configurable first delay, and that is adapted to provide a second clock signal that is a delayed version of the first clock signal. In one example, the clock recovery apparatus includes a second delay element providing a second delay, and adapted to provide a third clock signal that is a delayed version of the second clock signal.

The clock recovery apparatus may include a second sampling circuit configured to capture symbols in accordance with timing of pulses in the second clock signal, and/or a third sampling circuit configured to capture symbols in accordance with timing of pulses in the third clock signal. In various examples, one or more of the sampling circuits are implemented using flip-flops or registers that are clocked a corresponding clock signal.

The clock recovery apparatus may include an edge tracking circuit configured to calibrate the clock recovery apparatus by initializing the first delay element using a time value that causes the first sampling circuit, the second sampling circuit and the third sampling circuit to capture a first symbol in a first pair of symbols, and incrementally increasing the first delay until the second sampling circuit captures a first symbol from a second pair of symbols and the third sampling circuit captures a second symbol from the second pair of symbols. The first clock signal and a mid-phase signal derived from the second clock signal or the third clock signal may be used to capture symbols from the 3-wire interface after the clock recovery apparatus has been calibrated.

In one example, the clock recovery apparatus may be configured to incrementally increase the first delay in the first delay element after calibrating the second clock signal and the third clock signal, and provide the second clock signal as the mid-phase signal. In another example, the clock recovery apparatus may be configured to incrementally decrease the first delay after calibrating the second clock signal and the third clock signal, and provide the third clock signal as the mid-phase signal. In various examples, the clock recovery apparatus may include a third delay element providing a third delay and adapted to provide the mid-phase signal by delaying the second clock signal. The third clock signal may be a delayed version of the mid-phase signal.

In certain examples, the first delay element includes a programmable delay line. The edge tracking circuit may be configured to initialize the programmable delay line with a zero value. The edge tracking circuit may be configured to initialize the programmable delay line with a value configured to cause the second sampling circuit and the third sampling circuit to capture the same symbol in the first pair of symbols for expected variations in manufacturing process, circuit supply voltage, and die temperature. The edge tracking circuit may be configured to initialize the programmable delay line with an initial value configured to cause the second sampling circuit and the third sampling circuit to capture the same symbol in the first pair of symbols for all expected frequencies of the first clock signal.

In some aspects, a 3-phase signal is transmitted on each wire of the 3-wire interface and the 3-phase signal transmitted on each wire of the 3-wire interface is 120 degrees out-of-phase with each other wire in the 3-wire interface. In one example, the 3-wire interface may be operated in accordance with MIPI C-PHY specifications and/or protocols.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method for calibrating a clock recovery circuit, comprising:

recovering a first clock signal from transitions between pairs of symbols representative of successive signaling states of a 3-wire interface, wherein each pair of symbols includes a first symbol and a second symbol, wherein each pulse in the first clock signal corresponds to a transition from the first symbol to the second symbol, and wherein a first sampling circuit is configured to capture each first symbol in the pairs of symbols in accordance with the first clock signal and ignore each second symbol in the pairs of symbols;

generating a second clock signal by delaying the first clock signal by a first delay value, wherein a second sampling circuit is configured to capture symbols in accordance with the second clock signal;

generating a third clock signal by delaying the second clock signal, wherein a third sampling circuit is configured to capture symbols in accordance with the third clock signal;

calibrating the second clock signal and the third clock signal, including:

initializing the first delay value such that the first sampling circuit, the second sampling circuit and the third sampling circuit capture a same symbol in a first pair of symbols; and incrementally increasing the first delay value until the second sampling circuit and the third sampling circuit capture different symbols from each pair of symbols; and after calibrating the second clock signal and the third clock signal, using the first clock signal and a mid-phase signal derived from the second clock signal or the third clock signal to capture symbols from the 3-wire interface.

2. The method of claim 1, further comprising:
incrementally increasing the first delay value after calibrating the second clock signal and the third clock signal; and
providing the second clock signal as the mid-phase signal.

3. The method of claim 1, further comprising:
incrementally decreasing the first delay value after calibrating the second clock signal and the third clock signal; and
providing the third clock signal as the mid-phase signal.

4. The method of claim 1, further comprising:
generating the mid-phase signal by delaying the second clock signal.

5. The method of claim 4, wherein generating the third clock signal comprises:
generating the mid-phase signal by delaying the second clock signal; and
providing the third clock signal by delaying the mid-phase signal.

6. The method of claim 1, wherein calibrating the second clock signal and the third clock signal comprises:
configuring a programmable delay circuit.

7. The method of claim 1, wherein a 3-phase signal is transmitted on each wire of the 3-wire interface and the 3-phase signal transmitted on each wire of the 3-wire interface is 120 degrees out-of-phase with each other wire in the 3-wire interface.

8. The method of claim 1, wherein initializing the first delay value comprises:
zeroing the first delay value.

9. The method of claim 1, wherein initializing the first delay value comprises:
selecting an initial value for the first delay value configured to cause the second sampling circuit and the third sampling circuit to capture the same symbol in the first pair of symbols for expected variations in manufacturing process, circuit supply voltage, and die temperature.

10. The method of claim 1, wherein initializing the first delay value comprises:
selecting an initial value for the first delay value configured to cause the second sampling circuit and the third sampling circuit to capture the same symbol in the first pair of symbols for all expected frequencies of the first clock signal.

11. A clock recovery apparatus, comprising:
a plurality of difference receivers coupled to a 3-wire interface;
a clock recovery circuit configured to provide a first clock signal that includes pulses corresponding to transitions between pairs of symbols representative of successive signaling states of outputs of the plurality of difference receivers, wherein each pair of symbols includes a first symbol and a second symbol, and wherein each pulse in the first clock signal corresponds to a transition from the first symbol to the second symbol;
a first sampling circuit configured to capture each first symbol in the pairs of symbols in accordance with timing of pulses in the first clock signal and ignore each second symbol in the pairs of symbols;
a first delay element providing a configurable first delay, and adapted to provide a second clock signal that is a delayed version of the first clock signal;
a second sampling circuit configured to capture symbols in accordance with timing of pulses in the second clock signal;
a second delay element providing a second delay, and adapted to provide a third clock signal that is a delayed version of the second clock signal;
a third sampling circuit configured to capture symbols in accordance with timing of pulses in the third clock signal;
an edge tracking circuit configured to calibrate the clock recovery apparatus by:
initializing the first delay element using a time value that causes the first sampling circuit, the second sampling circuit and the third sampling circuit to capture the first symbol in a first pair of symbols; and
incrementally increasing the first delay until the second sampling circuit captures the first symbol from a second pair of symbols and the third sampling circuit captures the second symbol from the second pair of symbols,
wherein the first clock signal and a mid-phase signal derived from the second clock signal or the third clock signal are used to capture symbols from the 3-wire interface after the clock recovery apparatus has been calibrated.

12. The apparatus of claim 11, wherein the apparatus is configured to:
incrementally increase the first delay in the first delay element after calibrating the second clock signal and the third clock signal; and
provide the second clock signal as the mid-phase signal.

13. The apparatus of claim 11, wherein the apparatus is configured to:
incrementally decrease the first delay after calibrating the second clock signal and the third clock signal; and
provide the third clock signal as the mid-phase signal.

14. The apparatus of claim 11, further comprising:
a third delay element providing a third delay and adapted to provide the mid-phase signal by delaying the second clock signal.

15. The apparatus of claim 14, wherein the third clock signal is a delayed version of the mid-phase signal.

16. The apparatus of claim 11, wherein the first delay element comprises:
a programmable delay line.

17. The apparatus of claim 16, wherein the edge tracking circuit is configured to:
initialize the programmable delay line with a zero value.

18. The apparatus of claim 16, wherein the edge tracking circuit is configured to:
initialize the programmable delay line with a value configured to cause the second sampling circuit and the third sampling circuit to capture a same symbol in the first pair of symbols for expected variations in manufacturing process, circuit supply voltage, and die temperature.

19. The apparatus of claim 16, wherein the edge tracking circuit is configured to:
initialize the programmable delay line with an initial value configured to cause the second sampling circuit and the third sampling circuit to capture a same symbol in the first pair of symbols for all expected frequencies of the first clock signal.

20. The apparatus of claim 11, wherein a 3-phase signal is transmitted on each wire of the 3-wire interface and the 3-phase signal transmitted on each wire of the 3-wire interface is 120 degrees out-of-phase with each other wire in the 3-wire interface.

21. An apparatus comprising:
    means for recovering a first clock signal from transitions between pairs of symbols representative of successive signaling states of a 3-wire interface, wherein each pair of symbols includes a first symbol and a second symbol, wherein each pulse in the first clock signal corresponds to a transition from the first symbol to the second symbol;
    means for generating clock signals, including:
        a first delay element that produces a configurable first delay period, and is adapted to generate a second clock signal by delaying the first clock signal by the first delay period; and
        a second delay element configured to generate a third clock signal by delaying the second clock signal;
    means for capturing symbols including:
        a first sampling circuit adapted to capture each first symbol in the pairs of symbols in accordance with the first clock signal and further configured to ignore each second symbol in the pairs of symbols;
        a second sampling circuit adapted to capture symbols in the pairs of symbols in accordance with the second clock signal; and
        a third sampling circuit adapted to capture symbols in the pairs of symbols in accordance with the third clock signal; and
    means for calibrating the second clock signal and the third clock signal, wherein the means for calibrating is configured to:
        initialize the first delay period such that the first sampling circuit, the second sampling circuit and the third sampling circuit capture a same symbol in a first pair of symbols; and
        incrementally increase the first delay period until the second sampling circuit and the third sampling circuit capture different symbols from each pair of symbols,
    wherein the means for capturing symbols is configured to use the first clock signal and a mid-phase signal derived from the second clock signal or the third clock signal to capture symbols from the 3-wire interface after the second clock signal and the third clock signal have been calibrated.

22. The apparatus of claim 21, wherein the means for calibrating is configured to:
    incrementally modify the first delay period after calibrating the second clock signal and the third clock signal to obtain the mid-phase signal.

23. The apparatus of claim 21, wherein the means for calibrating is configured to:
    select an initial period for the first delay period configured to cause the second sampling circuit and the third sampling circuit to capture the same symbol in the first pair of symbols for expected variations in manufacturing process, circuit supply voltage, and die temperature.

24. The apparatus of claim 21, wherein the first delay element comprises a programmable delay line.

25. The apparatus of claim 21, wherein a 3-phase signal is transmitted on each wire of the 3-wire interface and the 3-phase signal transmitted on each wire of the 3-wire interface is 120 degrees out-of-phase with each other wire in the 3-wire interface.

26. A non-transitory processor-readable storage medium having one or more instructions which, when executed by at least one processor of a processing circuit, cause the processing circuit to:
    recover a first clock signal from transitions between pairs of symbols representative of successive signaling states of a 3-wire interface, wherein each pair of symbols includes a first symbol and a second symbol, wherein each pulse in the first clock signal corresponds to a transition from the first symbol to the second symbol, and wherein a first sampling circuit is configured to capture each first symbol in the pairs of symbols in accordance with the first clock signal and ignore each second symbol in the pairs of symbols;
    generate a second clock signal by delaying the first clock signal by a first delay value, wherein a second sampling circuit is configured to capture symbols in accordance with the second clock signal;
    generate a third clock signal by delaying the second clock signal, wherein a third sampling circuit is configured to capture symbols in accordance with the third clock signal;
    calibrate the second clock signal and the third clock signal, including:
        initialize the first delay value such that the first sampling circuit, the second sampling circuit and the third sampling circuit capture a same symbol in a first pair of symbols; and
        incrementally increase the first delay value until the second sampling circuit and the third sampling circuit capture different symbols from each pair of symbols; and
    after calibrating the second clock signal and the third clock signal, use the first clock signal and a mid-phase signal derived from the second clock signal or the third clock signal to capture symbols from the 3-wire interface.

27. The storage medium of claim 26, further comprising instructions configured to cause the processing circuit to:
    incrementally increase the first delay value after calibrating the second clock signal and the third clock signal when the mid-phase signal is derived from the second clock signal; and
    incrementally decrease the first delay value after calibrating the second clock signal and the third clock signal when the mid-phase signal is derived from the third clock signal.

28. The storage medium of claim 26, further comprising instructions configured to cause the processing circuit to:
    select an initial value for the first delay value configured to cause the second sampling circuit and the third sampling circuit to capture the same symbol in the first pair of symbols for expected variations in manufacturing process, circuit supply voltage, and die temperature.

29. The storage medium of claim 26, further comprising instructions configured to cause the processing circuit to:
    select an initial value for the first delay value configured to cause the second sampling circuit and the third sampling circuit to capture the same symbol in the first pair of symbols for all expected frequencies of the first clock signal; and
    configure a programmable delay circuit while calibrating the second clock signal and the third clock signal.

30. The storage medium of claim 26, wherein a 3-phase signal is transmitted on each wire of the 3-wire interface and the 3-phase signal transmitted on each wire of the 3-wire interface is 120 degrees out-of-phase with each other wire in the 3-wire interface.

* * * * *